US012490044B2

(12) United States Patent
Udesen

(10) Patent No.: US 12,490,044 B2
(45) Date of Patent: Dec. 2, 2025

(54) METHOD AND DEVICE FOR PROCESSING SPATIALIZED AUDIO SIGNALS

(71) Applicant: GN Audio A/S, Ballerup (DK)

(72) Inventor: Jesper Udesen, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 476 days.

(21) Appl. No.: 18/055,223

(22) Filed: Nov. 14, 2022

(65) Prior Publication Data

US 2023/0209300 A1 Jun. 29, 2023

(30) Foreign Application Priority Data

Dec. 29, 2021 (EP) .................................... 21218079

(51) Int. Cl.
*H04R 3/00* (2006.01)
*H04S 7/00* (2006.01)

(52) U.S. Cl.
CPC .............. *H04S 7/304* (2013.01); *H04S 7/307* (2013.01); *H04S 2400/11* (2013.01); *H04S 2400/15* (2013.01); *H04S 2420/01* (2013.01)

(58) Field of Classification Search
CPC ...... H04S 7/304; H04S 7/307; H04S 2400/11; H04S 2400/15; H04S 2420/01
USPC .......................................................... 381/310
See application file for complete search history.

(56) References Cited

U.S. PATENT DOCUMENTS

| | | | | |
|---|---|---|---|---|
| 5,883,961 | A * | 3/1999 | House | H04S 7/307 381/26 |
| 2003/0108209 | A1* | 6/2003 | McIntosh | H03G 5/005 381/103 |
| 2006/0045294 | A1* | 3/2006 | Smyth | H04S 7/304 381/74 |
| 2017/0215018 | A1* | 7/2017 | Rosset | H04S 5/005 |
| 2022/0021996 | A1* | 1/2022 | Brimijoin, II | H04S 7/304 |

OTHER PUBLICATIONS

The extended European Search Report issued in European Patent Application No. 21218079.8, dated Jun. 22, 2022.

Andreas Silzle, "Selection and Tuning of HRTFs", presented at the 112th Convention, 2002, May 10-13 Munich, Germany, Paper No. 5595, Audio Engineering Society.

Sunder et al., "Individualization of Binaural Synthesis Using Frontal Projection Headphones", Journal of the Audio Engineering Society. Audio Engineering Society vol. 61, No. 12, Dec. 2013.

* cited by examiner

*Primary Examiner* — Carolyn R Edwards
*Assistant Examiner* — Friedrich Fahnert
(74) *Attorney, Agent, or Firm* — HSML P.C.

(57) ABSTRACT

A method for processing an audio signal comprising a first and second spatialized audio signal, wherein the first audio signal has a first lateral spatializer of a multichannel audio spatializer, the second spatialized audio signal (R1) a second lateral spatializer of the multichannel audio spatializer, and the first and second spatialized audio signals differs from the each other. Also disclosed is a first equalizer transfer function receiving and filtering the first spatialized audio signal from first set of equalizer coefficients to provide a first equalized audio signal and second equalizer transfer function receiving and filtering the second spatialized audio signal.

13 Claims, 6 Drawing Sheets

METHOD AND DEVICE FOR PROCESSING SPATIALIZED AUDIO SIGNALS

The present invention relates to a method, such as a method performed by an electronic device, to a non-transitive computer-readable storage medium, to an electronic device and to an audio device, wherein a spatialized multichannel audio signal is processed to compensate for undesired sound coloration introduced by the spatializing.

BACKGROUND

Stereo signals and other multichannel audio signals may be used to convey sound to a listener in a way that allows for reproduction of a “sound image” wherein individual sound sources, such as speakers, singers, or musical instruments, appear to be positioned at different relative angles with respect to the listener. When a multichannel audio signal is intended for reproduction through two or more loudspeakers distributed in a listening room, the different source positions are typically achieved by mixing the individual sound sources with different amplitude weights for the respective loudspeaker signals. Within this document, a multichannel audio signal without other spatial information than a weighting of sound sources between its channels is referred to as a “flat” multichannel audio signal.

In the listening room, the left ear and the right ear of the listener receive the acoustic signals from the loudspeakers with different time delays and different levels. The difference in time delay is mainly caused by the different distances that the acoustic signals travel from the loudspeakers to the ears, and the difference in levels is mainly caused by the mixing weights and to some extent, particularly at higher frequencies, by the so-called “shadow effect” of the listener’s head. In addition, on each side of the head the outer ear modifies the acoustic signal. These modifications are highly dependent of the shapes of the outer ears and are thus typically unique to the listener.

Even in a standard stereo set-up with a pair of loudspeakers arranged symmetrically in front of the listener, an intact human auditory system is quite adept in translating spatial cues, i.e. time delay differences, level differences, and modifications caused by the outer-ear, in the acoustic signals received by the left and right ears into a sound image with high angular resolution of individual sound sources that are positioned in front of the listener and far from their head. Music producers often mix stereo signals such that they are optimized for listening through such a standard stereo set-up.

It is well known that stereo signals and other multichannel audio signals may be reproduced by headphones or other binaural listening devices that receive and process electronic audio signals to provide corresponding separate acoustic signals to respectively the left ear and the right ear of a user. It is also well known that the user of such a listening device generally perceives the individual sound sources in a flat multichannel audio signal as positioned inside their head, or close to and behind their head. Obviously, this in-head perception of sound sources is not optimal with respect to presenting a natural sound image to the user and it may further cause the user to feel fatigue after listening for some time.

A known solution to this problem is so-called “dummy-head recording” wherein the multichannel audio signal is recorded by microphones located in artificial ears of a dummy head configured to provide spatial cues in the same way as a real user’s head. While this approach may provide a multichannel audio signal optimized for listening through a binaural listening device, at least for users having similar outer ears and head sizes, it is not practical for providing multichannel audio signals suitable for quality reproduction through binaural listening devices to a large variety of users, and the recorded multichannel audio signals are often less suitable for quality reproduction through loudspeakers.

It is known in the art of audio processing that spatial information may be added to a flat multichannel audio signal to provide a left-ear audio signal and a right-ear audio signal such that a user listening to the left-ear and right-ear audio signals through a binaural listening device may perceive the individual sound sources in the multichannel audio signal as positioned far from their head. Within this document, processing a multichannel audio signal to provide a left-ear audio signal and a right-ear audio signal with additional spatial cues for reproduction by a binaural listening device is referred to as “spatializing”, and the resulting left-ear and right-ear audio signals are referred to as “spatialized”. Correspondingly, the combination of the spatialized left-ear and right-ear audio signals is referred to as a “spatialized multichannel audio signal”. Spatializing methods are well documented in the scientific and technical literature, and several solutions, such as software or hardware devices, are available on the market that are dedicated to spatializing multichannel audio signals, such as stereo music.

A well-known spatializing method is based on assuming a position of a virtual loudspeaker for each of two or more channels of a multichannel audio signal, assuming a position and an orientation of a user’s head, applying a first set of head-related filters to the respective channel signals and combine the filtered signals to provide a left-ear audio signal, and applying a second set of head-related filters to the respective channel signals and combine the filtered signals to provide a right-ear audio signal, wherein each head-related filter emulates a respective virtual acoustic path from a virtual loudspeaker to an ear of the user. Depending on how close the head-related filters correspond with the acoustic properties of the user’s head and outer ears, this spatializing method may generally restore the user’s perception of positions of individual sound sources in the multichannel audio signal when the user listens to the spatialized multichannel audio signal through a binaural listening device, meaning that the perceived positions match or approach the positions that the same user would perceive when listening to the original multichannel audio signal in a real listening room through real loudspeakers positioned corresponding to the assumed positions of the virtual loudspeakers.

One problem remains, however, in that the spatializing typically causes an undesired tonal coloration of the audio signal that generally changes with the user’s perception of the direction of the respective sound source in the spatialized multichannel audio signal, in part due to the head-related filters typically having non-flat gain transfer functions and/or non-linear phase transfer functions, and in part due to the combining of audio signals filtered with different delays. The user may perceive this coloration as a change of timbre (or tone colour) and it may, particularly for music, negatively affect the user’s perception of sound quality.

Fully compensating for the coloration requires knowledge of the relative position of each sound source in the spatialized multichannel audio signal. When the input to the spatializing is merely a stereo signal or another flat multichannel audio signal, determining a full compensation may thus at least be difficult, and in the general case, determining a perfect compensation for this coloration of a spatialized multichannel audio signal is not possible.

There is thus a need for a method or device for processing a spatialized multichannel audio signal that provides at least a good compensation for undesired coloration of a spatialized multichannel audio signal. In the present context, the term "good" refers to the user's perception of the left-ear and right-ear audio signals after compensation.

It is an object of the present invention to provide a method for processing a spatialized multichannel audio signal without the disadvantages of prior art as well as an audio device with similar advantages.

These and other objects of the invention are achieved by the invention defined in the independent claims and further explained in the following description.

Further objects of the invention are achieved by embodiments defined in the dependent claims and in the detailed description of the invention.

SUMMARY

Within this document, a multichannel audio spatializer is generally assumed to comprise:

- at least one first lateral spatializer configured to provide a first spatialized audio signal for a first ear of a user of a binaural listening device based on at least a first audio signal and a second audio signal of a multichannel audio signal; and
- at least one second lateral spatializer configured to provide a second spatialized audio signal for a second ear of the user based on at least the first audio signal and the second audio signal, wherein:

- the first spatialized audio signal is based on a combination of at least a first filtered signal and a second filtered signal;
- the second spatialized audio signal is based on a combination of at least a third filtered signal and a fourth filtered signal;
- the first filtered signal is based on filtering the first audio signal by a first head-related filter configured to emulate a first virtual acoustic path from a first virtual loudspeaker to the first ear of the user;
- the second filtered signal is based on filtering the second audio signal by a second head-related filter configured to emulate a second virtual acoustic path from a second virtual loudspeaker to the first ear of the user;
- the third filtered signal is based on filtering the first audio signal by a third head-related filter configured to emulate a third virtual acoustic path from the first virtual loudspeaker to the second ear of the user; and
- the fourth filtered signal is based on filtering the second audio signal by a fourth head-related filter configured to emulate a fourth virtual acoustic path from the second virtual loudspeaker to the second ear of the user.

The inventor has realized that, surprisingly, a good compensation for undesired coloration of a spatialized multichannel audio signal can be achieved by determining equalizers that compensate for undesired coloration in a mono-source scenario, and subsequently use the so determined equalizers to compensate for coloration also in non-mono-source scenarios. Within this document, the term "mono-source scenario" refers to a scenario in which, for each of the at least one first and at least one second lateral spatializers the respective head-related filters receive identical input signals. Furthermore, within this document, the term "lateral spatializer" refers to a spatializer, or a portion of a multichannel audio spatializer, that provides a spatialized audio signal for one ear only, such as a spatializer that provides a spatialized left-ear audio signal or a spatializer that provides a spatialized right-ear audio signal.

An advantage is that the so determined equalizers in practice may provide a nearly perfect compensation for—or equalization of—undesired coloration introduced by the spatialization, which has been confirmed by listening tests, while at the same time, the equalizers can easily be determined from properties of the signal processing blocks, the audio device(s), and/or the algorithms that are used for spatializing the multichannel audio signal.

According to a first aspect there is provided a method for processing a spatialized multichannel audio signal comprising a first spatialized audio signal and a second spatialized audio signal, wherein the first spatialized audio signal has been spatialized by a first lateral spatializer of a multichannel audio spatializer, the second spatialized audio signal has been spatialized by a second lateral spatializer of the multichannel audio spatializer, and the first spatialized audio signal differs from the second spatialized audio signal. The method comprises: by a first equalizer having a first equalizer transfer function receiving and filtering the first spatialized audio signal based on a first set of equalizer coefficients to provide a first equalized audio signal; and by a second equalizer having a second equalizer transfer function receiving and filtering the second spatialized audio signal based on a second set of equalizer coefficients to provide a second equalized audio signal wherein the first equalizer at least partly compensates for undesired coloration in the first spatialized audio signal in a mono-source scenario wherein the first spatialized audio signal equals the second spatialized audio signal; and the second equalizer at least partly compensates for undesired coloration in the second spatialized audio signal in a mono-source scenario wherein the first spatialized audio signal equals the second spatialized audio signal.

According to some embodiments, the method comprises by an equalizer controller: obtaining a representation of a first mono-source transfer function characterizing the first lateral spatializer and a representation of a second mono-source transfer function characterizing the second lateral spatializer; determining the first set of equalizer coefficients based on the representation of the first mono-source transfer function and a representation of a first predefined target transfer function; and determining the second set of equalizer coefficients based on the representation of the second mono-source transfer function and a representation of a second predefined target transfer function.

According to some embodiments, the equalizer controller: determines the first set of equalizer coefficients such that the product of the first mono-source transfer function and the first equalizer transfer function at least within a working frequency range aligns with the first predefined target transfer function; and determines the second set of equalizer coefficients such that the product of the second mono-source transfer function and the second equalizer transfer function at least within the working frequency range aligns with the second predefined target transfer function.

According to some embodiments, determining the first set of equalizer coefficients comprises inverting a representation of the first mono-source transfer function, and wherein determining the second set of equalizer coefficients comprises inverting a representation of the second mono-source transfer function.

According to some embodiments, the equalizer controller receives the representation of the first mono-source transfer function and the representation of the second mono-source transfer function from an external device, such as a device with a processor the method comprises and/or controlling the first lateral spatializer and the second lateral spatializer.

According to some embodiments, obtaining the representation of the first mono-source transfer function comprises feeding identical input audio signals to the inputs of the first lateral spatializer and comparing the first spatialized audio signal with at least one of the input audio signals, and obtaining the representation of the second mono-source transfer function comprises feeding identical input audio signals to the inputs of the second lateral spatializer and comparing the second spatialized audio signal with at least one of the input audio signals.

According to some embodiments, the method comprises: by each of the first lateral spatializer and the second lateral spatializer receiving a multichannel audio signal comprising a first audio signal and a second audio signal, wherein the first lateral spatializer comprises a first combiner, a first head-related filter and a second head-related filter, wherein the second lateral spatializer comprises a second combiner, a third head-related filter and a fourth head-related filter, wherein the first head-related filter emulates a first acoustic path from a first virtual loudspeaker to a first ear of a user, wherein the second head-related filter emulates a second acoustic path from a second virtual loudspeaker to the first ear of the user, wherein the third head-related filter emulates a third acoustic path from the first virtual loudspeaker to a second ear of the user, and wherein the fourth head-related filter emulates a fourth acoustic path from the second virtual loudspeaker to the second ear of the user; by the first head-related filter applying a first head-related transfer function, HRFL(θ1), to the first audio signal in conformance with a first set of filter coefficients to provide a first filtered signal; by the second head-related filter applying a second head-related transfer function, HRFL(θ2), to the second audio signal in conformance with a second set of filter coefficients to provide a second filtered signal; by the third head-related filter applying a third head-related transfer function, HRFL(θ3), to the first audio signal in conformance with a third set of filter coefficients to provide a third filtered signal; by the fourth head-related filter applying a fourth head-related transfer function, HRFL(θ1), to the second audio signal in conformance with a fourth set of filter coefficients to provide a fourth filtered signal; by the first combiner providing the first spatialized audio signal based on a combination of the first filtered signal and the second filtered signal; and by the second combiner providing the second spatialized audio signal based on a combination of the third filtered signal and the fourth filtered signal, wherein the first combiner, the first head-related transfer function, HRFL(θ1), and the second head-related transfer function, HRFL(θ2), together define the first mono-source transfer function, and wherein the second combiner, the third head-related transfer function, HRFL(θ3), and the fourth head-related transfer function, HRFL(θ4), together define the second mono-source transfer function.

According to some embodiments, and the equalizer controller receives a position signal indicating a relative angular position of the first virtual loudspeaker and/or the second virtual loudspeaker and, in response to receiving the position signal: determines two or more of the first, second, third and fourth sets of head-related filter coefficients based on the position signal; obtains an updated representation of the first mono-source transfer function and an updated representation of the second mono-source transfer function, wherein the updated representations reflect changes in the first, second, third and fourth head-related transfer functions, HRFL(θ1), HRFL(θ2), HRFL(θ3), HRFL(θ4); determines the first set of equalizer coefficients based on the updated representation of the first mono-source transfer function; and determines the second set of equalizer coefficients based on the updated representation of the second mono-source transfer function.

According to some embodiments, and the equalizer controller receives an orientation signal indicating a relative angular orientation of the user's head and, in response to receiving the orientation signal: determines the first, second, third and fourth sets of head-related filter coefficients based on the orientation signal; and maintains the first and second sets of equalizer coefficients as is in response to detecting a change in the relative angular orientation indicated by the orientation signal.

According to some embodiments, the method comprises providing the first equalized audio signal and the second equalized audio signal to a binaural listening device.

According to a second aspect there is provided a non-transitive computer-readable storage medium comprising one or more programs for execution by one or more processors of an electronic device with one or more processors, and memory; the one or more programs including instructions for performing the method of any of the preceding claims.

According to a third aspect there is provided an electronic device comprising one or more processors, and memory storing one or more programs, the one or more programs including instructions which, when executed by the one or more processors, cause the electronic device to perform the method of any of the first aspect.

According to a fourth aspect there is provided an audio device comprising a processor for processing a spatialized multichannel audio signal comprising a first spatialized audio signal and a second spatialized audio signal, wherein the first spatialized audio signal has been spatialized by a first lateral spatializer of a multichannel audio spatializer, the second spatialized audio signal has been spatialized by a second lateral spatializer of the multichannel audio spatializer, and the first spatialized audio signal differs from the second spatialized audio signal, the processor comprising: a first equalizer having a first equalizer transfer function configured to receive and filter the first spatialized audio signal based on a first set of equalizer coefficients to provide a first equalized audio signal; a second equalizer having a second equalizer transfer function configured to receive and filter the second spatialized audio signal based on a second set of equalizer coefficients to provide a second equalized audio signal, wherein: the first equalizer is configured to at least partly compensate for undesired coloration in the first spatialized audio signal in a mono-source scenario wherein the first spatialized audio signal equals the second spatialized audio signal; and the second equalizer is configured to at least partly compensate for undesired coloration in the second spatialized audio signal in a mono-source scenario wherein the first spatialized audio signal equals the second spatialized audio signal.

According to some embodiments, the audio device comprises an equalizer controller configured to: obtain a representation of a first mono-source transfer function characterizing the first lateral spatializer and a representation of a second mono-source transfer function characterizing the second lateral spatializer; determine the first set of equalizer coefficients based on the representation of the first mono-source transfer function and a representation of a first predefined target transfer function; and determine the second set of equalizer coefficients based on the representation of the second mono-source transfer function and a representation of a second predefined target transfer function.

According to some embodiments, the equalizer controller is configured to: determine the first set of equalizer coefficients such that the product of the first mono-source transfer function and the first equalizer transfer function at least within a working frequency range aligns with the first predefined target transfer function; and determine the second set of equalizer coefficients such that the product of the second mono-source transfer function and the second equalizer transfer function at least within the working frequency range aligns with the second predefined target transfer function.

According to some embodiments, the processor comprises a first lateral spatializer and a second lateral spatializer each configured to receive a multichannel audio signal comprising a first audio signal and a second audio signal, wherein: the first lateral spatializer comprises a first combiner, a first head-related filter configured to emulate a first acoustic path from a first virtual loudspeaker to a first ear of a user and a second head-related filter configured to emulate a second acoustic path from a second virtual loudspeaker to the first ear of the user; the second lateral spatializer comprises a second combiner, a third head-related filter configured to emulate a third acoustic path from the first virtual loudspeaker to a second ear of the user and a fourth head-related filter configured to emulate a fourth acoustic path from the second virtual loudspeaker to the second ear of the user;—the first head-related filter is configured to apply a first head-related transfer function, HRFL(θ1), to the first audio signal in conformance with a first set of filter coefficients to provide a first filtered signal; the second head-related filter is configured to apply a second head-related transfer function, HRFL(θ2), to the second audio signal in conformance with a second set of filter coefficients to provide a second filtered signal; the third head-related filter is configured to apply a third head-related transfer function, HRFL(θ3), to the first audio signal in conformance with a third set of filter coefficients to provide a third filtered signal; the fourth head-related filter is configured to apply a fourth head-related transfer function, HRFL(θ4), to the second audio signal in conformance with a fourth set of filter coefficients to provide a fourth filtered signal; the first combiner is configured to provide the first spatialized audio signal based on a combination of the first filtered signal and the second filtered signal; the second combiner is configured to provide the second spatialized audio signal based on a combination of the third filtered signal and the fourth filtered signal; the first combiner, the first head-related transfer function, HRFL(θ1), and the second head-related transfer function, HRFL(θ2), together define the first mono-source transfer function; and the second combiner, the third head-related transfer function, HRFL(θ3), and the fourth head-related transfer function, HRFL(θ4), together define the second mono-source transfer function.

According to some embodiments, the audio device comprises a binaural listening device, wherein the processor comprises a processor of an electronic device and/or a processor of the binaural listening device.

In some embodiments, an electronic device, earphones and/or a headphone are examples of audio devices comprising a processor that may receive, provide and/or process audio signals, such as spatialized audio signals, such as spatialized multichannel audio signals as further described within this document.

In some embodiments, the audio device is configured to be worn by a user. The audio device may be arranged at the user's ear, on the user's ear, over the user's ear, in the user's ear, in the user's ear canal, behind the user's ear and/or in the user's concha, i.e., the audio device is configured to be worn in, on, over and/or at the user's ear. The audio device may form a binaural listening device, such as a pair of earphones, such as e.g. including a first earphone and a second earphone, such as a headphone including a first ear-cup and a second ear-cup, the pair of earphones and/or the first ear-cup and the second ear-cup may be connected, such as wirelessly connected and/or connected by wires, to form a binaural listening device.

In some embodiments, the audio device comprises an acoustic output transducer, e.g. a miniature loudspeaker, arranged in the audio device to emit acoustic waves towards the user's respective eardrums.

In some embodiments, the electronic device may comprise the processor and the electronic device may execute the methods described above, or parts hereof. In some embodiments, the electronic device provides an output to a wearable audio device, the wearable audio device providing an output for a user, such as an acoustic output for a user.

In some embodiments, the method, electronic device and audio device provides a processed spatialized multichannel audio signal for outputting to a user.

Effects and features of the second through fourth aspects are to a large extent analogous to those described above in connection with the first aspect. Embodiments mentioned in relation to the first aspect are largely compatible with the second through fourth aspects.

Note that multichannel audio spatializers may be configured in other ways than described above. The methods or devices disclosed herein may, however, be applied with most multichannel audio spatializers that provide a first and a second spatialized audio signal as respective linear combinations, or combinations that are at least not strongly non-linear, of at least a first audio signal and a second audio signal of a multichannel audio signal, provided that such a multichannel audio spatializer at least partly emulates the respective virtual acoustic paths from a first and a second virtual loudspeaker to the left ear and the right ear of the user.

The present invention relates to different aspects including the method for processing a spatialized multichannel audio signal and audio device and an electronic device described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE FIGURES

A more detailed description follows below with reference to the drawing, in which.

DETAILED DESCRIPTION

Figure 1A:
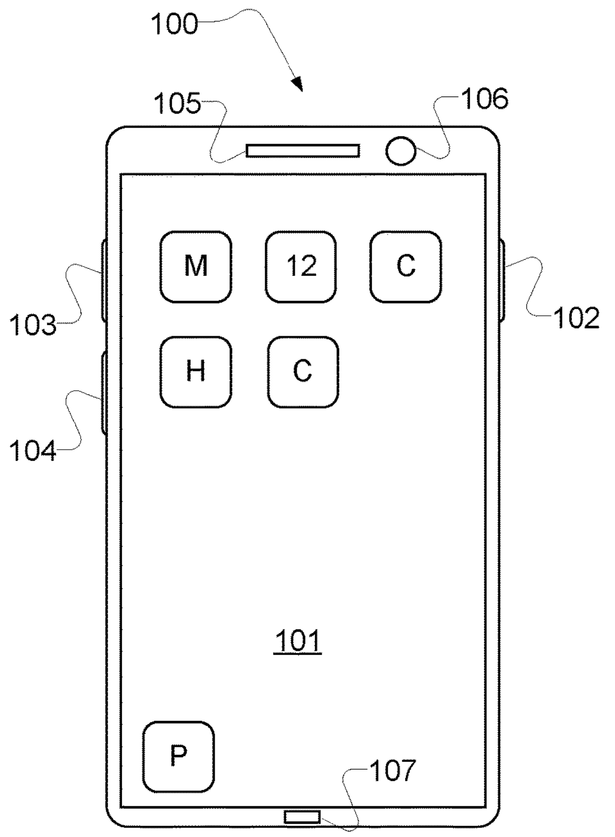
FIG. 1*a* shows an electronic device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1*a* shows an electronic device. The electronic device 100 includes a touch-sensitive display 101, physical input buttons 102, 103 and 104, a camera lens 106 for a built-in camera (not shown), a loudspeaker opening 105, and a microphone opening 107. The electronic device 100 displays a set of icons and/or affordances designated "M", "12", "C", "H", "C" and "P". An affordance, as known in the art of graphical user interfaces, has a graphical icon and properties that help a user understand that they can interact with it, and supports the interaction that may be involved. For instance, one of the affordances "C" may be tapped to activate an application, e.g. an app, that performs the method described herein. In some examples the application includes a media player for playing a stream of media data, such as a multichannel audio signal, and/or serves as a software-based user interface for one or more binaural listening devices.

Figure 1B:
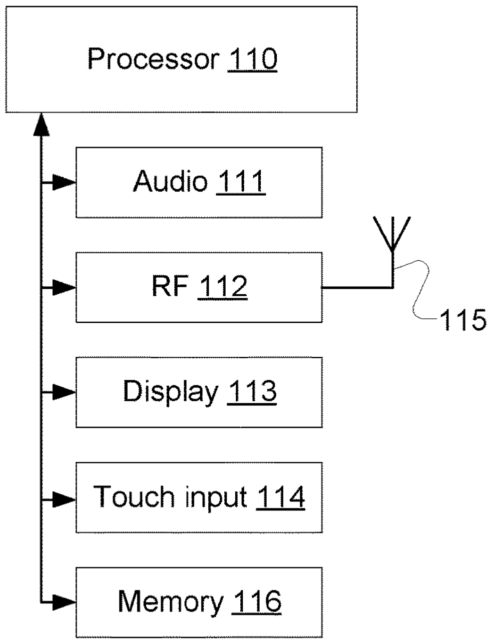
FIG. 1*b* shows hardware elements of the electronic device.

FIG. 1*b* shows hardware elements of the electronic device. The hardware elements comprise a processor 110 that may include a combination of one or more hardware elements. In this respect, the processor may be configured to run one or more a software programs or software components thereof including the application that can be activated via the affordance "C" and/or to perform the method described herein. The processor 110 is coupled to an audio circuit 111, a radio frequency circuit 112, including one or more antennas 115, a display 113, which may be display 101, a touch input circuit 114 and a memory 115. The audio circuit 111 may include one or more microphones, loudspeakers, and interfaces for connecting peripheral audio devices.

Figure 1C:
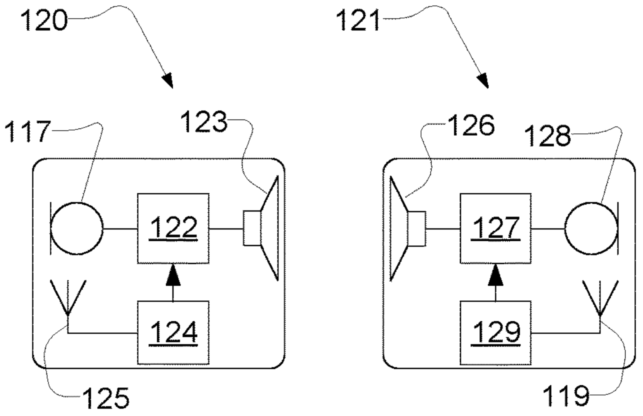
FIG. 1*c* shows a block diagram of a first binaural listening device, e.g. a pair of earphones.

FIG. 1*c* shows a block diagram of a first binaural listening device, here exemplified as a pair of earphones 120, 121. The earphone 120 may be configured for insertion into e.g. a left ear and/or ear canal of the user and the earphone 121 may be configured for insertion into e.g. a right ear and/or ear canal of the user. The earphones 120, 121 may have the same or similar circuits, but they may have differently shaped housings to fit in respectively a left ear and/or ear canal and a right ear and/or ear canal.

The earphones 120, 121 each comprises an antenna 125 and a transceiver 124 for receiving a wireless audio signal e.g. from the electronic device 100 and/or for communicating with the respective other one of the earphones 120, 121. In some examples, one of the earphones 120, 121 acts as a primary device that to some degree controls the respective other, secondary earphone 120, 121. An acoustic output transducer 123, 126, e.g. a miniature loudspeaker, is arranged in each earphone 120, 121 to emit acoustic signals towards the user's respective eardrums.

In some examples, one or both of the earphones 120, 121 comprises an acoustic input transducer 117, 128, e.g. a microphone, arranged in the earphone 120, 121 e.g. facing the environment of the user and/or in a microphone arm extending from the earphone 120, 121. Processor 122, 127 may be configured to perform the method described herein and/or to enable communication, including processing, between the input transducer 117, 128, transceiver 124, 129 and acoustic output transducer 123, 126. Processor 122, 127 may comprise an amplifier for driving the respective acoustic output transducer 123, 126.

Figure 1D:
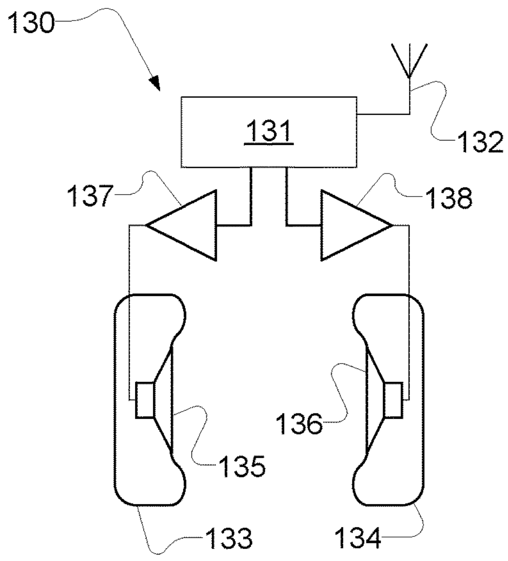
FIG. 1*d* shows a block diagram of a second binaural listening device, e.g. a headphone.

FIG. 1*d* shows a block diagram of a second binaural listening device, here exemplified as a headphone 130. The headphone 130 includes a first ear-cup 133 and a second ear-cup 134 each accommodating an acoustic output transducer 135: 136, e.g. a small loudspeaker, to emit acoustic signals towards the user's respective ears or eardrums. The headphone 130 includes a processor 131 which can communicate, e.g. wirelessly via antenna 132, with the electronic device 100. The headphone 130 may also include an amplifier 137 for driving the acoustic output transducer 135 and an amplifier 138 for driving the acoustic output transducer 136.

In some examples, the headphone 130 comprises an acoustic input transducer, e.g. a microphone, (not shown) arranged in the headphone 130, e.g. facing the environment of the user, and/or in a microphone arm extending from the listening device to receive acoustic sound from outside the ear-cup.

Processor 131 may be configured to perform the method described herein and/or to enable communication, including processing, between the acoustic input transducer, antenna 132 and the acoustic output transducers 133, 134.

The earphones 120, 121 and the headphone 130 are examples of binaural listening devices having an acoustic output transducer for each of the users ears and that can used for reproducing a spatialized multichannel audio signal to the user.

Each of the earphones 120, 121 and the headphone 130 may be configured as earphones for listening to audio signals received from another device, as hearing protectors for protecting the ears of a user, and/or as a headset for communicating with one or more remote parties. In any configuration, the earphones 120, 121 and/or the headphone 130 may additionally be configured as a hearing aid to compensate for a user's hearing loss. In each of the earphones 120, 121 and the headphone 130, the acoustic input transducer 117, 128 may be engaged for enabling pick-up of the user's voice, e.g. for transmission to a remote party, for enabling feed-forward noise cancelling, for enabling a so-called "hear-through" mode and/or for enabling compensation for a hearing loss of the user. Each of the earphones 120, 121 and the headphone 130 may additionally, or alternatively, comprise a microphone (not shown) arranged at, in or close to the ear canal, and/or in the first and second ear-cups 133, 134, to capture a feedback signal, e.g. for active noise-cancelling and/or active occlusion cancelling.

Each of the electronic device 100, the earphones 120, 121 and the headphone 130 are examples of audio devices comprising a processor 110, 122, 127, 131 that may receive, provide and/or process audio signals, such as spatialized audio signals, such as spatialized multichannel audio signals as further described within this document.

Figure 2:
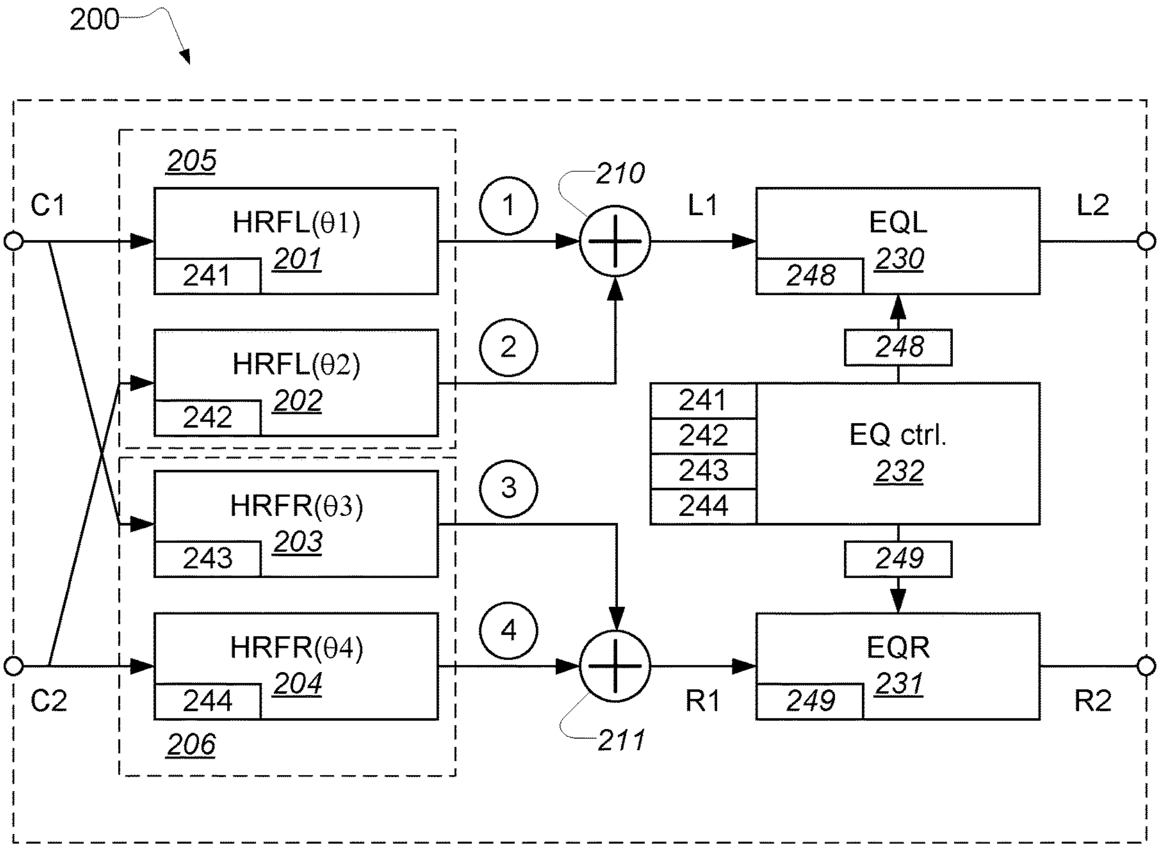
FIG. 2 shows a first block diagram of a processor.

FIG. 2 shows a first block diagram of a processor 200 that may be comprised by e.g. one or more of the processors 110, 122, 127 or 131. The processor 200 is configured to receive a multichannel audio signal, e.g. a stereo signal, including a first audio signal (e.g. the left channel of a stereo signal) C1 and a second audio signal (e.g. the right channel of a stereo signal) C2. The block diagram shown in FIG. 2 illustrates process steps of a method for processing a multichannel audio signal as well as functional blocks of an audio device for processing a multichannel audio signal.

The processor 200 comprises a first set 205 of head-related filters comprising a first head-related filter 201 and a second head-related filter 202, wherein each of the first and the second head-related filters 201, 202 is configured to receive and filter a respective one of the first and the second audio signals C1, C2 and to provide respectively a first and a second filtered signal 1, 2 based on a respective set 241, 242 of head-related filter coefficients; a first combiner 210 configured to receive the first and second filtered signals 1, 2 from the first set 205 of head-related filters and to provide a first spatialized audio signal L1 based on a combination of the first filtered signal 1 and the second filtered signal 2; and a first equalizer 230 configured to receive and filter the first spatialized audio signal L1 based on a first set 248 of equalizer coefficients to provide a first equalized audio signal L2.

The processor 200 comprises a second set 206 of head-related filters comprising a third head-related filter 203 and a fourth head-related filter 204, wherein each of the third and the fourth head-related filters 203, 204 is configured to receive and filter a respective one of the first and the second audio signals C1, C2 and to provide respectively a third and a fourth filtered signal 3, 4 based on a respective set 243, 244 of head-related filter coefficients; a second combiner 211 configured to receive the third and fourth filtered signals 3, 4 from the second set 206 of head-related filters and to provide a second spatialized audio signal R1 based on a combination of the third filtered signal 3 and the fourth filtered signal 4; and a second equalizer 231 configured to receive and filter the second spatialized audio signal R1 based on a second set 249 of equalizer coefficients to provide a second equalized audio signal R2.

The first head-related filter 201 is configured to emulate a first acoustic path from a first virtual loudspeaker 401 (see FIG. 4*a*) to a first ear of a user, the second head-related filter 202 is configured to emulate a second acoustic path from a second virtual loudspeaker 402 (see FIG. 4*a*) to the first ear of the user, the third head-related filter 203 is configured to emulate a third acoustic path from the first virtual loudspeaker 401 to a second ear of the user, and the fourth head-related filter 204 is configured to emulate a fourth acoustic path from the second virtual loudspeaker 402 to the second ear of the user.

The first set 205 of head-related filters and the first combiner 210 together function as a first lateral spatializer that receives the first and the second audio signals C1, C2 as inputs and in response provides the first spatialized audio signal L1. Similarly, the second set 206 of head-related filters and the second combiner 211 together function as a second lateral spatializer that receives the first and the second audio signals C1, C2 as inputs and in response provides the second spatialized audio signal R1. The first lateral spatializer 205, 210 and the second lateral spatializer 206, 211 together form a multichannel audio spatializer.

In the mono-source scenario, for each of the first and second lateral spatializers the respective head-related filters receive identical input signals, i.e. the first and the second head-related filters 201, 202 receive identical inputs, and the third and the fourth head-related filters 203, 204 receive identical inputs. For the example shown in FIG. 2, the mono-source scenario is thus given for both the first and the second lateral spatializer when the first and the second audio signals C1, C2 are equal. Conversely, a non-mono-source scenario is given when the first and the second audio signals C1, C2 differ from each other. In the mono-source scenario, each of the first and the second spatialized audio signal L1, R1 is the same as when the inputs C1, C2 to each of the first and the second lateral spatializers were connected to each other. For this scenario we define for the first and the second lateral spatializer respectively a first and a second mono-source transfer function that equals the transfer function of the respective lateral spatializer when all its inputs are connected to each other. The first mono-source transfer function thus characterizes the first lateral spatializer and the second mono-source transfer function characterizes the second lateral spatializer. In general, a mono-source transfer function may be defined to characterize any lateral spatializer.

The meaning of the first and second mono-source transfer functions may be illustrated using an analogy with imaginary filters. In the example shown in FIG. 2, the first mono-source transfer function equals the transfer function of a first imaginary filter that comprises the first head-related filter 201 and the second head-related filter 202 coupled in parallel and followed by the first combiner 210, such that the input of the first imaginary filter is connected directly to each of the inputs of the first head-related filter 201 and the second head-related filter 202, and such that the output of the first imaginary filter is connected directly to the output of the first combiner 210 which adds the output signals 1, 2 of respectively the first head-related filter 201 and the second head-related filter 202. Similarly, the second mono-source transfer function equals the transfer function of a second imaginary filter that comprises the third head-related filter 203 and the fourth head-related filter 204 coupled in parallel and followed by the second combiner 211, such that the input of the second imaginary filter is connected directly to each of the inputs of the third head-related filter 203 and the fourth head-related filter 204, and such that the output of the second imaginary filter is connected directly to the output of the second combiner 211 which adds the output signals 3, 4 of respectively the third head-related filter 203 and the fourth head-related filter 204. While the first and second first imaginary filters may be referred to in the following, they are not necessarily implemented in the method or audio device.

The head-related filters 201, 202, 203, 204 are each configured to apply a respective head-related transfer function HRFL(θ1), HRFL(θ2), HRFR(θ3), HRFR(θ4) to its respective input signal, in conformance with its respective set 241, 242, 243, 244 of head-related filter coefficients. The values θ1, θ2, θ3, θ4 indicated in the parentheses indicate that the head-related transfer function HRFL(θ1), HRFL(θ2), HRFR(θ3), HRFR(θ4) may depend on the relative angular position of the respective virtual loudspeakers. Similarly, the equalizers 230, 231 are each configured to apply a respective equalizer transfer function EQL, EQR to its respective input signal L1, R1, in conformance with respectively a first and a second set 248, 249 of equalizer coefficients. For each of the above-mentioned head-related filters 201, 202, 203, 204 and equalizers 230, 231, the respective set 241, 242, 243, 244, 248, 249 of coefficients thus determines the relation between the respective filter's input signal C1, C2, L1, L2 and its respective output signal 1, 2, 3, 4, L2, R2.

Each or any filter among the head-related filters 201, 202, 203, 204 and the equalizers 230, 231 may be implemented as a filter operating in the time-domain, such as a Finite Impulse Response (FIR) filter or an Infinite Impulse Response (IIR) filter, or as a filter operating in the frequency domain. In general, these filters may all be implemented to operate in the same domain, i.e. in the time-domain or in the frequency domain. For instance, the equalizers 230, 231 may have a similar, e.g. the same, filter structure as the head-related filters 201, 202, 203, 204. The filter structure may e.g. be an M-tap time-domain filter or e.g. an M-bin frequency-domain filter, wherein M is an integer e.g. M=30. M may be any integer number e.g. in the range M=8-128. However, one or more of these filters may be implemented to operate in the respective other domain, and, where required or appropriate, the processor 200, and/or one or more of the processors 110, 122, 127 or 131, may comprise one or more signal domain converters, such as Fast Fourier Transformation (FFT) or Inverse FFT (IFFT) converters, for converting audio signals from the time domain to the frequency domain or vice versa. Similarly, where required or appropriate, the processor 200, and/or one or more of the processors 110, 122, 127 or 131, may comprise one or more analog-to-digital converters and/or one or more digital-to-analog converters for converting analog audio signals into digital audio signals or vice versa.

As is well known in the art, signal combiners may be implemented in a variety of ways, such as e.g. signal subtractors. Furthermore, head-related filters and/or signal combiners may include other functional blocks such as signal amplifiers, signal attenuators and/or signal inverters. For ease of reading, the current disclosure assumes that the combiners 210, 211 are implemented as adders that each provides the respective first or second spatialized audio signal L1, R1 as a sum of its filtered signal inputs 1, 2, 3, 4. Furthermore, unless stated otherwise, it is assumed that the combiners 210, 211 and the head-related filters 201, 202, 203, 204 do not comprise any of the above-mentioned, other functional blocks, and that the head-related transfer functions HRFL(θ1), HRFL(θ2), HRFR(θ3), HRFR(θ4) thus reflect the transfer functions respectively from the first audio signal C1 to the first spatialized audio signal L1 when the second audio signal C2 is absent or null, from the second audio signal C2 to the first spatialized audio signal L1 when the first audio signal C1 is absent or null, from the first audio signal C1 to the second spatialized audio signal R1 when the second audio signal C2 is absent or null, and from the second audio signal C2 to the second spatialized audio signal R1 when the first audio signal C1 is absent or null. Obviously, any deviation from this assumed implementation may require the inclusion of one or more other functional blocks, such as the ones mentioned above, to preserve the intended operation of the method or audio device. In general, it is considered a routine task for the audio engineer to make such modifications.

Within this document, the term "transfer function" denotes a mathematical function that describes the frequency-dependent amplitude and phase relation between the output and the input of a specific acoustic path or an electronic path or device, such as any of the head-related filters 201, 202, 203, 204 or the equalizers 230, 231. A transfer function may be analytical or discrete, and may be represented in a variety of ways, e.g. depending on the implementation of the specific electronic path or device. For instance, in the frequency domain, a transfer function may be represented by a frequency-dependent function, such as a frequency-dependent gain/phase-delay function, a set of gain/phase-delay values or by a set of filter coefficients for a frequency domain filter. Similarly, a transfer function may in the time-domain be represented by a time-dependent function, such as an impulse response function, a set of impulse response values or a set of filter coefficients for a time-domain filter, such as a FIR filter or an IIR filter. As is well known in the art, frequency-dependent transfer functions may be derived from, and thus be determined by, corresponding time-dependent functions, such as impulse response functions, impulse response values, or time-domain filter coefficients. Furthermore, the art comprises many methods for estimating time-domain filters that provide desired frequency-dependent transfer functions. Correspondingly, within this document, a "representation of" a transfer function shall be understood as any function, set of values, or set of filter coefficients that determines the respective transfer function.

Also, generally, the transfer function of a series connection of two filters equals the product of the transfer function of the first filter and the transfer function of the second filter. Correspondingly, within this document, the term "product" denotes a mathematical function that combines the transfer function of a first filter and the transfer function of a second filter into a transfer function that equals the transfer function of a series connection of the first filter and the second filter.

An equalizer controller 232 determines the first set 248 of equalizer coefficients for the first equalizer 230 such that the first equalizer 230 at least partly compensates for undesired coloration in the first spatialized audio signal L1 in a mono-source scenario, and determines the second set 249 of equalizer coefficients for the second equalizer 231 such that the second equalizer 231 at least partly compensates for undesired coloration in the second spatialized audio signal R1 in a mono-source scenario.

The equalizer controller 232 preferably obtains a representation of the first mono-source transfer function and a representation of the second mono-source transfer function, in FIG. 2 illustrated as the sets 241, 242, 243, 244 of head-related filter coefficients, determines the first set 248 of equalizer coefficients for the first equalizer 230 based on a representation of the first mono-source transfer function and a first predefined target transfer function, and determines the second set 249 of equalizer coefficients for the second equalizer 231 based on a representation of the second mono-source transfer function and a second predefined target transfer function.

In some embodiments of the method or audio device, the equalizer controller 232 may alternatively, or additionally, determine the first and second sets 248, 249 of equalizer coefficients based on one or more stored equalizer datasets each indicating a representation of a first equalizer transfer function EQL for the first equalizer 230 and/or a representation of a second equalizer transfer function EQR for the second equalizer 231. The one or more equalizer datasets may be stored in a non-volatile memory of the processor 200, e.g. during manufacturing of the processor 200, or during a calibration procedure wherein the processing of the spatialized multichannel audio signal L1, R1 is adapted to a specific multichannel audio spatializer, and/or to a specific configuration of a multichannel audio spatializer, such as a multichannel audio spatializer 205, 210, 206, 211 comprised by the processor 200 or a multichannel audio spatializer comprised by a device external to the processor 200. The one or more equalizer datasets may be written to the non-volatile memory of the processor 200 by the equalizer controller 232 and/or by a device external to the processor 200.

In some embodiments of the method or audio device, the equalizer controller 232 may be omitted. In such embodiments, the first set 248 of equalizer coefficients for the first equalizer 230 may be predetermined such that the first equalizer 230 at least partly compensates for undesired coloration in the first spatialized audio signal L1 in a mono-source scenario, and the second set 249 of equalizer coefficients for the second equalizer 231 may be predetermined such that the second equalizer 231 at least partly compensates for undesired coloration in the second spatialized audio signal R1 in a mono-source scenario. In some such embodiments, the first and second equalizers 230, 231 may be predetermined to equalize a respective first or second spatialized audio signal L1, R1 provided by a static multichannel audio spatializer 205, 210, 206, 211, such as a multichannel audio spatializer comprised by the processor 200 or a multichannel audio spatializer comprised by a device external to the processor 200.

In some embodiments of the method or audio device, the first lateral spatializer 205, 210 and the second lateral spatializer 206, 211 may be omitted in the processor 200, and the processor 200 may instead receive the first and second spatialized audio signals L1, R1 from a spatializer device external to the processor 200. Such an external spatializer device may then comprise a further processor 200 that comprises the first lateral spatializer 205, 210 and the second lateral spatializer 206, 211 and is configured to spatialize the multichannel audio signal and provide the first and second spatialized audio signals L1, R1. In such embodiments, the equalizer controller 232, if present, may obtain the representation of a first mono-source transfer function and the representation of a second mono-source transfer function in other ways as described in the following.

In functional terms, the processor 200 executes a method for processing a spatialized multichannel audio signal comprising a first spatialized audio signal L1 and a second spatialized audio signal R1, wherein the first spatialized audio signal L1 has been spatialized by a first lateral spatializer 205, 210 of a multichannel audio spatializer, the second spatialized audio signal R1 has been spatialized by a second lateral spatializer 206, 211 of the multichannel audio spatializer, and the first spatialized audio signal L1 differs from the second spatialized audio signal R1. The method comprises:

- by a first equalizer 230 having a first equalizer transfer function EQL receiving and filtering the first spatialized audio signal L1 based on a first set 248 of equalizer coefficients to provide a first equalized audio signal L2; and
- by a second equalizer 231 having a second equalizer transfer function EQR receiving and filtering the second spatialized audio signal R1 based on a second set 249 of equalizer coefficients to provide a second equalized audio signal R2, wherein:

- the first equalizer 230 at least partly compensates for undesired coloration in the first spatialized audio signal L1 in a mono-source scenario wherein the first spatialized audio signal L1 equals the second spatialized audio signal R1; and
- the second equalizer 231 at least partly compensates for undesired coloration in the second spatialized audio signal R1 in a mono-source scenario wherein the first spatialized audio signal L1 equals the second spatialized audio signal R1.

In the method, an equalizer controller 232 preferably:

- obtains a representation of a first mono-source transfer function characterizing the first lateral spatializer 205, 210 and a representation of a second mono-source transfer function characterizing the second lateral spatializer 206, 211;
- determines the first set 248 of equalizer coefficients based on the representation of the first mono-source transfer function and a representation of a first predefined target transfer function; and
- determines the second set 249 of equalizer coefficients based on the representation of the second mono-source transfer function and a representation of a second predefined target transfer function.

The equalizer controller 232 preferably determines the first set 248 of equalizer coefficients such that the product of the first mono-source transfer function and the first equalizer transfer function EQL aligns with the first predefined target transfer function, at least within a working frequency range, and determines the second set 249 of equalizer coefficients such that the product of the second mono-source transfer function and the second equalizer transfer function EQR aligns with the second predefined target transfer function, at least within the working frequency range.

Within this document, a first transfer function is defined to "align with" a second transfer function when—and only when—at any frequency within the working frequency range, the difference between the gain of the first transfer function and the gain of the second transfer function is within ±6 dB, preferably within +3 dB, and more preferably within ±1 dB, and the difference between the phase delay of the first transfer function and the phase delay of the second transfer function is within ±45°, preferably within ±30°, more preferably within ±20°, or even more preferably within ±10°.

In the example shown in FIG. 2, the first mono-source transfer function equals the sum of the first head-related transfer function HRFL(θ1) and the second head-related transfer function HRFL(θ2), and the second mono-source transfer function equals the sum of the third head-related transfer function HRFR(θ3) and the fourth head-related transfer function HRFR(θ4).

In a typical case, the first predefined target transfer function and the second predefined target transfer function are equal and have a flat gain and a linear phase delay over frequency, at least within the working frequency range. In this case, the first equalizer transfer function EQL is preferably inverse to the first mono-source transfer function and the second equalizer transfer function EQR is preferably inverse to the second mono-source transfer function. As explained further below, there may be cases wherein the first predefined target transfer function and the second predefined target transfer function are not equal and/or do not have a flat gain and a linear phase delay. In these cases, the first equalizer transfer function EQL may not be inverse to the first mono-source transfer function and/or the second equalizer transfer function EQR may not be inverse to the second mono-source transfer function.

Within this document, two transfer functions are defined to be "inverse" to each other when—and only when—the product of their transfer functions aligns with an arbitrary transfer function that has a flat gain and a linear phase delay over frequency, at least within the working frequency range.

Correspondingly, two filters are inverse to each other when—and only when—their transfer functions are inverse to each other.

To determine the first set 248 of equalizer coefficients such that the first equalizer transfer function EQL is inverse to the first mono-source transfer function the equalizer controller 232 may invert a representation of the first mono-source transfer function. Correspondingly, to determine the second set 249 of equalizer coefficients such that the second equalizer transfer function EQR is inverse to the second mono-source transfer function, the equalizer controller 232 may invert a representation of the second mono-source transfer function. The equalizer controller 232 may e.g. invert each of the obtained representation of the first mono-source transfer function and the obtained representation of the second mono-source transfer function. The equalizer controller 232 may modify the respective representation before and/or after inverting it, e.g. to convert it from the time domain to the frequency domain or vice versa, and/or to adapt the representation to a representation better suitable for determining the respective first and second sets 248, 249 of equalizer coefficients.

$$EQL(n) = \frac{HT_{Left}(n)}{HMS_{Left}(n)} nEQL(n)HT_{Left}(n)HMS_{Left}(n)EQL(n)$$

In the example shown in in FIG. 2, the equalizer controller 232 may determine the transfer function EQL of the first equalizer 230 based on the equation:

$$EQL(n) = \frac{HT_{Left}(n)}{HMS_{Left}(n)} nEQL(n)HT_{Left}(n)HMS_{Left}(n)EQL(n)$$

wherein is a frequency index, is a discrete representation of the transfer function EQL of the first equalizer 230, is a discrete representation of the first predefined target transfer function, and is a discrete representation of the first mono-source transfer function that equals the sum of the first head-related transfer function HRFL(θ1) and the second head-related transfer function HRFL(θ2). The equalizer controller 232 may determine the first set 248 of equalizer coefficients from the determined discrete transfer function as known in the art.

$$EQL(n) = \frac{HT_{Left}(n)}{HMS_{Left}(n)} nEQL(n)HT_{Left}(n)HMS_{Left}(n)EQL(n)$$

$$EQR(n) = \frac{HT_{Right}(n)}{HMS_{Right}(n)} EQR(n)HT_{Right}(n)HMS_{Right}(n)EQR(n)$$

Correspondingly, the equalizer controller 232 may determine the transfer function EQR of the second equalizer 231 based on the equation:

$$EQR(n) = \frac{HT_{Right}(n)}{HMS_{Right}(n)} EQR(n)HT_{Right}(n)HMS_{Right}(n)EQR(n)$$

wherein is a discrete representation of the transfer function EQR of the second equalizer 231, is a discrete representation of the second predefined target transfer function, and is a discrete representation of the second mono-source transfer function that equals the sum of the third head-related transfer function HRFL(θ3) and the fourth head-related transfer function HRFL(θ4). The equalizer controller 232 may determine the second set 249 of equalizer coefficients from the determined a discrete transfer function as known in the art.

$$EQR(n) = \frac{HT_{Right}(n)}{HMS_{Right}(n)} EQR(n)HT_{Right}(n)HMS_{Right}(n)EQR(n)$$

As can be seen, in this example, determining each of the first set 248 and the second set 249 of equalizer coefficients may comprise inverting a representation of the respective mono-source transfer function.

In the typical case wherein the first predefined target transfer function and the second predefined target transfer function are equal and have a flat gain and a linear phase delay over frequency, at least within the working frequency range, $HT_{Left}(n)$ and $HT_{Right}(n)$ may each be replaced with a constant, such as unity (or "1").

$h_{Left}^{EQ}(m)=h_{Left}^{T}(m)*(h_{Left}^{MS}(m))^{-1}$ in the case that the first, second, third and fourth head-related transfer functions HRFL(θ1), HRFL(θ2), HRFL(θ), HRFL(θ4) are not directly available to the equalizer controller 232, then it may determine other representations of the transfer function EQL of the first equalizer 230 and the transfer function EQR of the second equalizer 230 based on similar equations. For instance, the equalizer controller 232 may determine an impulse response of the first equalizer 230 based on the equation:

$$h_{Left}^{EQ}(m)=h_{Left}^{T}(m)*(h_{Left}^{MS}(m))^{-1}$$

wherein m is a time index, $h_{Left}^{EQ}(m)$ is the impulse response of the first equalizer 230, $h_{Left}^{T}(m)$ is a representation of the first predefined target transfer function in the form of a corresponding impulse response, $h_{Left}^{MA}(m)$ is a representation of the first mono-source transfer function in the form of a corresponding impulse response that equals the sum of the impulse response of the first head-related filter 201 and the impulse response of the second head-related filter 202, the symbol "*" (asterisk) designates the convolution operation, and $(h)^{-1}$ designates an operation to determine the impulse response of a filter which is inverse to a filter with the impulse response h. The equalizer controller 232 may determine the first set 248 of equalizer coefficients from the impulse response $h_{Left}^{EQ}(m)$ of the first equalizer 230 as known in the art.

$h_{Right}^{EQ}(m)=h_{Right}^{T}(m)*(h_{Right}^{MS}(m))^{-1}$ Correspondingly, the equalizer controller 232 may determine an impulse response of the second equalizer 231 based on the equation:

$$h_{Right}^{EQ}(m)=h_{Right}^{T}(m)*(h_{Right}^{MS}(m))^{-1}$$

wherein m is a time index, $h_{Right}^{EQ}(m)$ is the impulse response of the second equalizer 231, $h_{Right}^{T}(m)$ is a representation of the second predefined target transfer function in the form of a corresponding impulse response, and $h_{Right}^{MS}(m)$ is a representation of the second mono-source transfer function in the form of a corresponding impulse response that equals the sum of the impulse response of the third head-related filter 203 and the impulse response of the fourth head-related filter 204. The equalizer controller 232 may determine the second set 249 of equalizer coefficients from the impulse response $h_{Right}^{EQ}(m)$ of the second equalizer 231 as known in the art.

As can be seen, also in the time-domain case, determining each of the first set 248 and the second set 249 of equalizer coefficients may comprise inverting a representation of the respective mono-source transfer function.

Also here, in the typical case wherein the first predefined target transfer function and the second predefined target transfer function are equal and have a flat gain and a linear phase delay over frequency, at least within the working frequency range, the impulse responses $h_{Left}^{T}(m)$ and $h_{Right}^{T}(m)$ may each be replaced with a constant, such as unity (or "1").

As stated further above, the processor 200 may receive the first and second spatialized audio signals L1, R1 from an external spatializer device. In this case, the equalizer controller 232 and/or the processor 200 may also receive the representation of the first mono-source transfer function and the representation of the second mono-source transfer function from the external spatializer device. The external spatializer device may thus comprise a spatialization controller configured to control sets 241, 242, 243, 244 of filter coefficients for the first lateral spatializer 205, 210 and the second lateral spatializer 206, 211 as well as to determine and provide the representation of the first mono-source transfer function and the representation of the second mono-source transfer function in the same way as the equalizer controller 232. Alternatively, a third device external to the processor 200 and the external spatializer device may be configured to control sets 241, 242, 243, 244 of filter coefficients for the first lateral spatializer 205, 210 and the second lateral spatializer 206, 211 of the external spatializer device as well as to determine and provide the representation of the first mono-source transfer function and the representation of the second mono-source transfer function in the same way as the equalizer controller 232.

The equalizer controller 232 and/or the processor 200 may thus receive the representation of the first mono-source transfer function and the representation of the second mono-source transfer function from an external device, such as a device 100, 120, 121, 130 with a processor 110, 122, 121, 131, 200 comprising and/or controlling the first lateral spatializer 205, 210 and the second lateral spatializer 206, 211.

Alternatively, or additionally, a representation of the first mono-source transfer function and a representation of the second mono-source transfer function may be obtained by measuring the first mono-source transfer function and the second mono-source transfer function, or respective representations of the mono-source transfer functions, of a multichannel audio spatializer comprising a first and a second lateral spatializer, such as the external spatializer device or the multichannel audio spatializer comprised by the processor 200. Accordingly, the equalizer controller 232, the processor 200 and/or the third external device may obtain a representation of the first mono-source transfer function by feeding identical input audio signals C1, C2 to the inputs of the first lateral spatializer 205, 210 of the external spatializer device or the processor 200 and comparing the first spatialized audio signal L1 with at least one of the input audio signals C1, C2, and may obtain a representation of the second mono-source transfer function by feeding identical input audio signals C1, C2 to the inputs of the second lateral spatializer 206, 211 of the external spatializer device or the processor 200 and comparing the second spatialized audio signal R1 with at least one of the input audio signals C1, C2.

The equalizer controller 232, the processor 200 and/or the third external device may generate and/or otherwise provide the identical audio signals C1, C2 as wide-band audio signals and feed the wide-band audio signals to the first and second lateral spatializers to be measured. Alternatively, the first and second lateral spatializers to be measured may receive the identical audio signals C1, C2 as wide-band audio signals from an external audio source, such as a media player, and the equalizer controller 232, the processor 200 and/or the third external device may receive at least one of the identical audio signals C1, C2 for comparison with the first and/or the second spatialized audio signal L1, R1.

As stated further above, the processor 200 may provide the spatialization of the multichannel audio signal. In functional terms, the processor 200 may execute a method for spatializing a multichannel audio signal, wherein the method comprises:

- by each of a first lateral spatializer 205, 210 and a second lateral spatializer 206, 211 receiving a multichannel audio signal comprising a first audio signal C1 and a second audio signal C2, wherein the first lateral spatializer 205, 210 comprises a first combiner 210, a first head-related filter 201 and a second head-related filter 202, and wherein the second lateral spatializer comprises a second combiner 211, a third head-related filter 203 and a fourth head-related filter 204, wherein the first head-related filter 201 emulates a first acoustic path from a first virtual loudspeaker 401 to a first ear of a user, wherein the second head-related filter 202 emulates a second acoustic path from a second virtual loudspeaker 402 to the first ear of the user, wherein the third head-related filter 203 emulates a third acoustic path from the first virtual loudspeaker 401 to a second ear of the user, and wherein the fourth head-related filter 204 emulates a fourth acoustic path from the second virtual loudspeaker 402 to the second ear of the user;
- by the first head-related filter 201 applying a first head-related transfer function HRFL(θ1) to the first audio signal C1 in conformance with a first set 241 of filter coefficients to provide a first filtered signal 1;
- by the second head-related filter 202 applying a second head-related transfer function HRFL(θ2) to the second audio signal C2 in conformance with a second set 242 of filter coefficients to provide a second filtered signal 2;
- by the third head-related filter 203 applying a third head-related transfer function HRFL(θ3) to the first audio signal C1 in conformance with a third set 243 of filter coefficients to provide a third filtered signal 3;
- by the fourth head-related filter 204 applying a fourth head-related transfer function HRFL(θ4) to the second audio signal C2 in conformance with a fourth set 244 of filter coefficients to provide a fourth filtered signal 4;
- by the first combiner 210 providing the first spatialized audio signal L1 based on a combination of the first filtered signal 1 and the second filtered signal 2; and
- by the second combiner 211 providing the second spatialized audio signal R1 based on a combination of the third filtered signal 3 and the fourth filtered signal 4, wherein the first combiner 210, the first head-related transfer function HRFL(θ1) and the second head-related transfer function HRFL(θ2) together define the first mono-source transfer function, and wherein the second combiner 211, the third head-related transfer function HRFL(θ3) and the fourth head-related transfer function HRFL(θ4) together define the second mono-source transfer function.

The equalizer controller 232 may obtain the representation of the first mono-source transfer function and the representation of the second mono-source transfer function as described further above, or it may determine or receive the respective representations e.g. in the form of filter data for the first and/or second sets 205, 206 of head-related filters, such as e.g. respective sets 241, 242, 243, 244 of head-related filter coefficients, respective impulse response functions and/or respective head-related transfer functions HRFL(θ1), HRFL(θ2), HRFR(θ3), HRFR(θ4), and/or other data enabling the equalizer controller 232 to determine the first and second sets 248, 249 of equalizer coefficients as described herein and in more detail in the following.

For ease of reading, we define a left channel processing path that includes the signal paths from the first and second audio signals C1, C2 to the first equalized audio signal L2, and a right channel processing path that includes the signal paths from the first and second audio signals C1, C2 to the second equalized audio signal R2.

In the case that the spatialization of the multichannel audio signal L1, R1 is provided in an external spatializer device as described further above, then we instead define the left channel processing path to include the signal paths from the first and second audio signals C1, C2 in the external spatializer device to the first equalized audio signal L2, and the right channel processing path to include the signal paths from the first and second audio signals C1, C2 in the external spatializer device to the second equalized audio signal R2.

The left and right channel processing paths thus comprise the functional blocks of the external spatializer device and/or the processor 200 that provide the spatialization and the equalization of the multichannel audio signal. We further define the left channel processing path to have a left channel transfer function, and the right channel processing path to have a right channel transfer function, wherein the left and right channel transfer functions define the gain and phase delay of the respective processing paths in the mono-source scenario, i.e. when for each of the first and second lateral spatializers 205, 210, 206, 211 the respective head-related filters 201, 202, 203, 204 receive identical input signals C1, C2. In other words, the left channel transfer function equals the product of the first mono-source transfer function and the first equalizer transfer function EQL, and the right channel transfer function equals the product of the second mono-source transfer function and the second equalizer transfer function EQR.

Determining the first set 248 of equalizer coefficients such that the product of the first mono-source transfer function and the first equalizer transfer function EQL at least within the working frequency range aligns with the first predefined target transfer function, and determining the second set 249 of equalizer coefficients such that the product of the second mono-source transfer function and the second equalizer transfer function EQR at least within the working frequency range aligns with the second predefined target transfer function, will thus cause the left channel transfer function to align with the first predefined target transfer function and the right channel transfer function to align with the second predefined target transfer function, at least within the working frequency range, and thus cause the left and right channel processing paths to exhibit the targeted frequency dependency.

To achieve a flat gain and a linear phase delay within the working frequency range in each of the left and right channel processing paths, each of the first predefined target transfer function and the second predefined target transfer function may be determined to have a flat gain and a linear phase delay within the working frequency range. In this case, the first equalizer transfer function EQL will be inverse to the first mono-source transfer function within the working frequency range and the second equalizer transfer function EQR will be inverse to the second mono-source transfer function within the working frequency range.

Conversely, to achieve a non-flat gain and/or a non-linear phase delay within the working frequency range in at least one of the left and right channel processing paths, the respective one or both of the first predefined target transfer function and the second predefined target transfer function may be determined to have a non-flat gain and/or a non-linear phase delay within the working frequency range. In this case, the first equalizer transfer function EQL will generally not be inverse to the first mono-source transfer function within the working frequency range and/or the second equalizer transfer function EQR will generally not be inverse to the second mono-source transfer function within the working frequency range.

In any case, if the processor 200 in addition to the first equalizer 230 comprises a first frequency-dependent filter in the signal path between the first spatialized audio signal L1 and the first equalized audio signal L2, then the first predefined target transfer function should be modified by dividing it with the transfer function of the first frequency-dependent filter to ensure that the left channel transfer function aligns with the first predefined target transfer function. In other words, after the modification, the first predefined target transfer function should equal the product of the desired left channel transfer function and the inverse of the transfer function of the first frequency-dependent filter. Similarly, if the processor 200 in addition to the second equalizer 231 comprises a second frequency-dependent filter in the signal path between the second spatialized audio signal R1 and the second equalized audio signal R2, then the second predefined target transfer function should be modified by dividing it with the transfer function of the second frequency-dependent filter to ensure that the right channel transfer function aligns with the second predefined target transfer function.

Non-flat gains and/or non-linear phase delays in the left and/or right channel transfer functions may be utilized to provide frequency shaping of the spatialized multichannel audio signal, e.g. to emphasize or suppress one or more frequency ranges, and/or to provide classic music controls to a user, such as bass, treble, and loudness controls. Each of the first predefined target transfer function and the second predefined target transfer function may thus be static or variable.

In the case that any of the first predefined target transfer function and the second predefined target transfer function is variable, then the equalizer controller 232 and/or the processor 200 may be configured to receive a frequency control signal (not shown) and to modify the first predefined target transfer function and the second predefined target transfer function based on the frequency control signal. The frequency control signal may e.g. be received from a user interface, such as a user interface of the electronic device 100. The equalizer controller 232 preferably redetermines at least one of the first and second sets 248, 249 of equalizer coefficients in response to detecting a change in the frequency control signal and/or in any of the first predefined target transfer function and the second predefined target transfer function.

Listening test have shown that the herein disclosed configuration of—or methods of determining the sets 248, 249 of equalizer coefficients for—the equalizers 230, 231 in practice provide a good compensation for—or a good equalization of—unintended coloration caused by the head-related filters and the combiners, even when listening to a typical stereo signal or another multichannel audio signal wherein the first and the second audio signals C1, C2 differ from each other. This is surprising, because for such non-mono signals, the equalization is technically and mathematically far from perfect. Apparently, typical stereo signals and other multichannel audio signals comprise enough mono or near-mono content to trick human perception. The perceived quality of the equalization may generally degrade with increasing angular spread of instruments or other sound sources in the sound image, in particular for the angular outermost sound sources. Such degradation may, however, be of less concern—and be less noticeable by the user, in particular when reproducing audio scenes with varying sound source positions, such as movie soundtracks, wherein sound sources only occasionally occur at the angular outermost positions.

At the same time, the sets 248, 249 of equalizer coefficients for the equalizers 230, 231 can be easily determined from properties of the lateral spatializers 205, 210, 206, 211, such as from properties of the head-related filters 201, 202, 203, 204. The working frequency range may cover the entire nominally audible frequency range, i.e. the frequency range from 20 Hz to 20 kHz, or may be adapted to match or cover the frequency range of e.g. a headphone or a set of earphones, to match or cover the frequency range of the music or sound to be reproduced and/or to match or cover a frequency range wherein spatialization is determined to be effective. The working frequency range may have a lower limit of about e.g. 20 Hz, 50 Hz, 100 Hz, 200 Hz, 300 Hz, or 500 Hz and/or have an upper limit of about e.g. 20 kHz, 15 kHz or 10 kHz.

Thus, the first equalizer 230 may at least partly compensate for unintended coloration in the first spatialized audio signal L1. Similarly, the second equalizer 231 may at least partly compensate for unintended coloration in the second spatialized audio signal R1.

In some examples, the multichannel audio signal is a stereo signal wherein the first audio signal C1 is e.g. a left channel signal and the second audio signal C2 is e.g. a right channel signal. In some examples, the multichannel audio signal is a surround sound signal, such as a 5.1 surround sound signal, a 7.1 surround sound signal or another of the many commonly used surround sound formats. All, or fewer than all, of the channels may be processed by the method or audio devices as explained in more detail herein.

Figure 3:
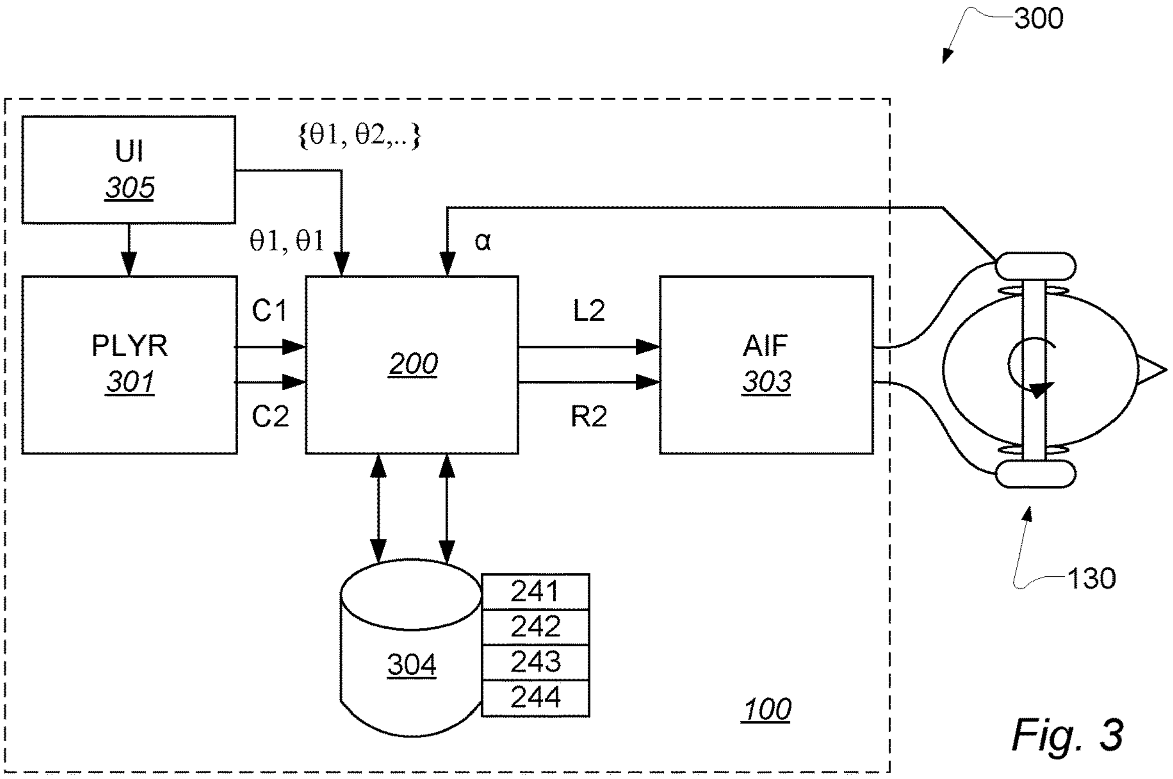
FIG. 3 shows a first block diagram of a system.

FIG. 3 shows a first block diagram of a system 300 comprising a processor 200, an audio player 301, an audio interface 303, a database 304 and a user interface 305. The processor 200 comprises a multichannel spatializer 205, 210, 206, 211, a first equalizer 230, a second equalizer 231, and an equalizer controller 232 as described further above. The processor 200 receives a multichannel audio signal C1, C2 from the audio player 301, spatializes the multichannel audio signal, processes the spatialized multichannel audio signal to compensate for undesired coloration in the first and second spatialized audio signals L1, R1 as described further above, and provides the resulting first and second equalized audio signals L2, R2 to a headphone 130 via the audio interface 303. The audio interface may comprise a wired interface, such as a wired analog stereo signal connector or a USB connector, and/or a wireless interface, such as a Bluetooth transceiver, a DECT transceiver, a Wi-Fi transceiver, or an optical audio transmitter.

The user interface 305 enables a user to control the audio player 301 and/or control the position of at least the first and the second virtual loudspeaker 401, 402 for respective channels of the multichannel audio signal as explained in further detail in the following, e.g. by selecting a value for each of one or more relative angular positions θ, −θ, +θ, θ1, θ2, θ3, θ4 (see FIGS. 4*a*, 4*b*, 5 and 7). In response to detecting such a user action, the user interface 305 provides a position signal indicating a relative angular position θ, −θ, +θ, θ1, θ2, θ3, θ4 of at least the first virtual loudspeaker 401 and/or the second virtual loudspeaker 402 to the equalizer controller 232. In some examples, one or more of the relative angular position relative angular positions θ, −θ, +θ, θ1, θ2, θ3, θ4 is fixed and not selectable. In some examples, the user interface 305 enables the user to enter number values to select values for one or more of the relative angular positions θ, −θ, +θ, θ1, θ2, θ3, θ4. In some examples, the user interface 305 enables the user to select values for one or more of the relative angular positions θ, −θ, +θ, θ1, θ2, θ3, θ4 in increments of e.g. 5° (degrees) e.g. in a range from e.g. −90° to 0°, from −90° to +90°, from 0° to +90° or in another range e.g. over a range of 180°, 270°, or 360°.

Correspondingly, the equalizer controller 232 may receive a position signal indicating a relative angular position θ, −θ, +θ, θ1, θ2, θ3, θ4 of the first virtual loudspeaker 401 and/or the second virtual loudspeaker 402 and, in response to receiving the position signal:

- determine two or more of the first, second, third and fourth sets 241, 242, 243, 244 of head-related filter coefficients based on the position signal;
- obtain an updated representation of the first mono-source transfer function and an updated representation of the second mono-source transfer function, wherein the updated representations reflect changes in the first, second, third and fourth head-related transfer functions HRFL(θ1), HRFL(θ2), HRFL(θ3), HRFL(θ4);
- determine the first set 248 of equalizer coefficients based on the updated representation of the first mono-source transfer function; and
- determine the second set 249 of equalizer coefficients based on the updated representation of the second mono-source transfer function.

The database 304 may comprise one or more filter datasets, each indicating multiple one or more filter data, such as sets 241, 242, 243, 245 of filter coefficients for respective head-related filters 201, 202, 203, 204 comprised by the processor 200. In some embodiments, the database 304 may serve as a non-volatile memory of one or more processors 200, and/or it may be comprised by the processor 200. The database 304 may preferably include a filter dataset for each selectable value of the relative angular positions θ, −θ, +θ, θ1, θ2, θ3, θ4. The database 304 may include further filter datasets for intermediate values of the relative angular positions θ, −θ, +θ, θ1, θ2, θ3, θ4 in order to enable the equalizer controller 232 to determine sets 241, 242, 243, 245 of filter coefficients for values of the relative angular positions θ, −θ, +θ, θ1, θ2, θ3, θ4 that are not selectable by the user, such as for all integer degree (°) values of the relative angular positions θ, −θ, +θ, θ1, θ2, θ3, θ4, e.g. between −90° and +90°, or between −180° and +180°. The angular resolution may be coarser, such every 2°, every 3°, every 5°, or every 10°.

Corresponding equalizer datasets each indicating a representation of a first equalizer transfer function EQL for the first equalizer 230 and/or a representation of a second equalizer transfer function EQR for the second equalizer 231, such as the first and/or second sets 248, 249 of equalizer coefficients, may be stored in the filter datasets, in some of the filter datasets, and/or independently of the filter datasets, in the database 304 or in another non-volatile memory of the processor 200. The stored data may comprise one or more equalizer datasets for each filter dataset, such that the equalizer controller 232 may obtain an updated representation of the first mono-source transfer function and an updated representation of the second mono-source transfer function, and/or determine the first and second sets 248, 249 of equalizer coefficients by retrieving from the database 304 and/or another non-volatile memory of the processor 200 respective filter datasets and/or equalizer datasets for the relative angular position or positions θ, −θ, +θ, θ1, θ2, θ3, θ4 indicated by the position signal.

The equalizer controller 232 may thus, in response to receiving the position signal, determine the two or more of the first, second, third and fourth sets 241, 242, 243, 244 of head-related filter coefficients by retrieving a filter dataset for a relative angular position θ, −θ, +θ, θ1, θ2, θ3, θ4 indicated by the position signal and determining the respective sets 241, 242, 243, 244 of head-related filter coefficients based on respective sets 241, 242, 243, 244 of filter coefficients indicated by the retrieved filter dataset.

The headset 130 and/or the system 300 may comprise a head tracker that provides an orientation signal indicating a relative angular orientation α of the user's head 410 (see FIG. 4*b*) to the processor 200. The head tracker may determine or estimate the relative angular orientation α of the user's head 410 based e.g. on an orientation signal from an accelerometer or other orientation sensor comprised in the headphone 130, and/or on signals from a camera or other telemetric device in the system 300. The processor 200 may receive the orientation signal through the audio interface 303, through a control interface, such as an optical receiver, or directly from the telemetric device.

Correspondingly, the equalizer controller 232 may preferably receive an orientation signal indicating a relative angular orientation α of the user's head 410, e.g. from the head tracker, and, in response to receiving the orientation signal:

- determine the first, second, third and fourth sets 241, 242, 243, 244 of head-related filter coefficients based on the orientation signal, e.g. as described further above while accommodating the relative angular orientation α into the respective relative angular positions θ, −θ, +θ, θ1, θ2, θ3, θ4; and
- maintain the first and second sets 248, 249 of equalizer coefficients as is, e.g. by ignoring the relative angular orientation α, in response to detecting a change in the relative angular orientation α indicated by the orientation signal.

In other words, the first and second equalizers 230, 231 are preferably not changed when the relative angular orientation α of the user's head changes. Listening test has shown that users perceive the sound quality of the thus equalized audio signals L2, R2 as higher than when the first and second sets 248, 249 of equalizer coefficients are updated using the methods described further above when the relative angular orientation α of the user's head changes.

Figure 4A:
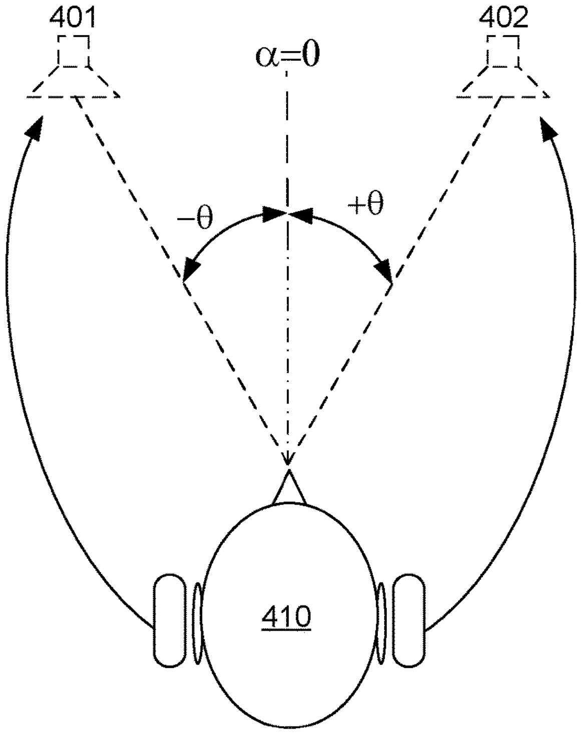
FIGS. 4*a* and 4*b* show a top view of a user's head in a first acoustic setting and a second acoustic setting.
Figure 4B:
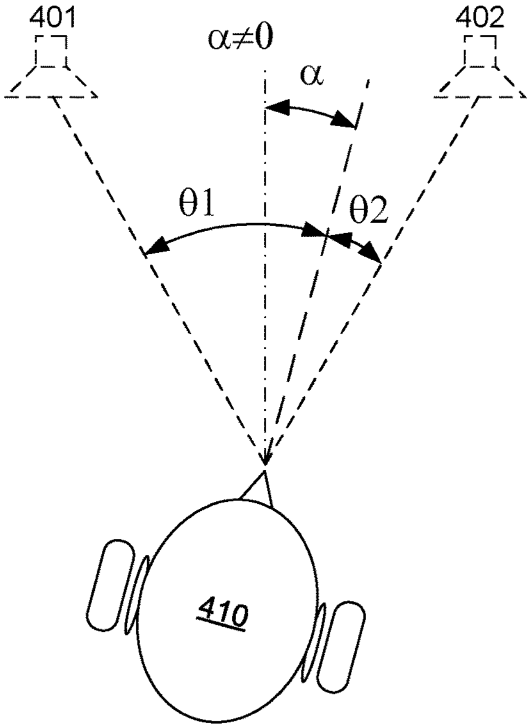
Figure 7:
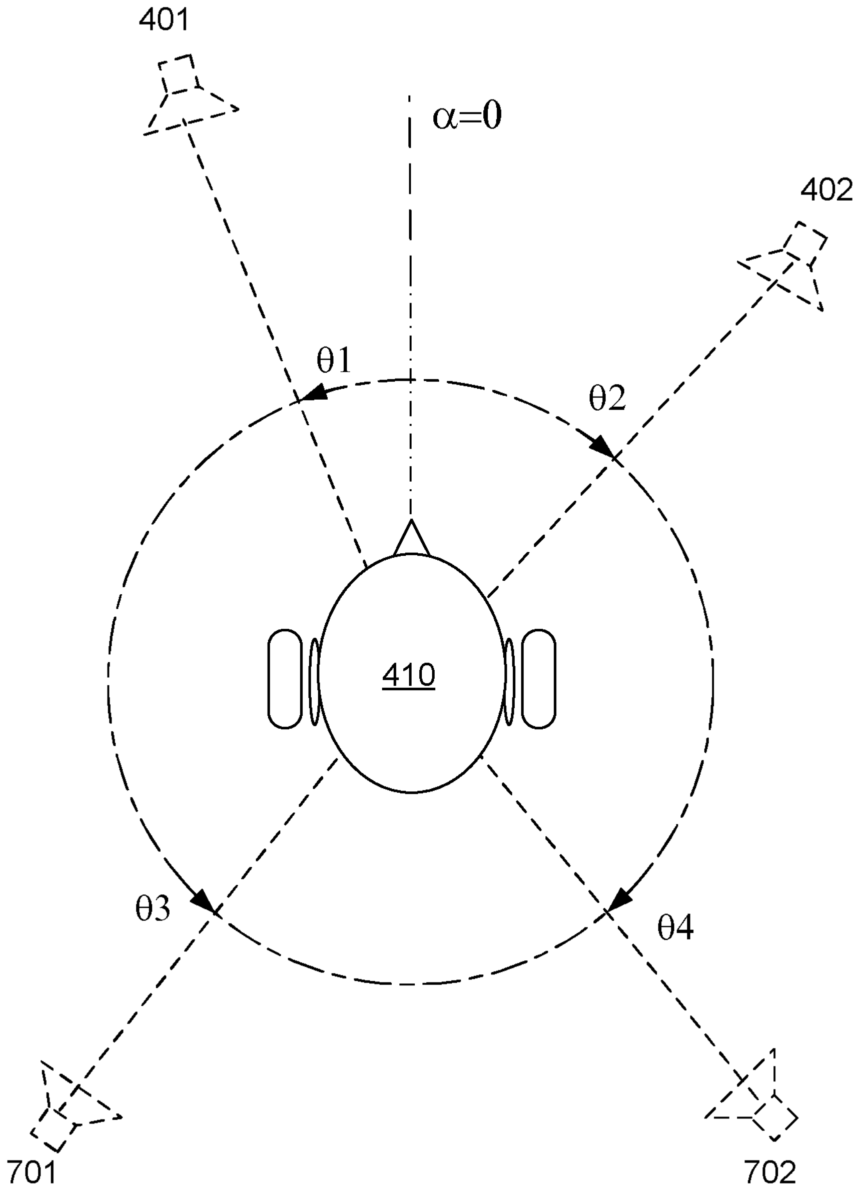
FIG. 7 shows a top view of a user's head in a third acoustic setting.

Each of FIGS. 4*a*, 4*b* and 7 illustrate a virtual listening room wherein two or more virtual, or imaginary, loudspeakers 401, 402, 701, 702 are arranged at specific relative angular positions with respect to a user's head 410. Each virtual listening room thus defines a relative angular position for each of the first and second (or more) audio signals C1, C2 of a multichannel audio signal. To have the user perceive the virtual loudspeakers 401, 402, 701, 702 as appearing at the defined relative angular positions, the audio signals from the first and second (or more) audio signals C1, C2 are preferably filtered and combined in the same way they would be acoustically filtered and combined in a real listening room on their way from respective correspondingly positioned real loudspeakers to the user's ears. This may be achieved by configuring the head-related filters 201, 202, 203, 204 of the multichannel audio spatializer such that the first head-related filter 201 emulates a first acoustic path from a first virtual loudspeaker 401 to a first (e.g. left) ear of a user, the second head-related filter 202 emulates a second acoustic path from a second virtual loudspeaker 402 to the first ear of the user, the third head-related filter 203 emulates a third acoustic path from the first virtual loudspeaker 401 to a second (e.g. right) ear of the user, and the fourth head-related filter 204 emulates a fourth acoustic path from the second virtual loudspeaker 402 to the second ear of the user.

Sets 241, 242, 243, 244 of head-related filter coefficients for the respective head-related filters 201, 202, 203, 204 may be obtained in known ways from respective representations of suitable head-related transfer functions HRFL(θ1), HRFL(θ2), HRFR(θ3), HRFR(θ4) that may also be obtained in known ways. The representations may e.g. be based on generic head-related transfer functions obtained using a manikin, e.g. a so-called "HATS" or "KEMAR", with acoustic transducers. Alternatively, or additionally, the representations may be based on personal or personalized head-related transfer functions obtained using sound probes inserted into the user's ear canal during exposure to sound from different directions and/or from 3D scans of the user's head and ears.

The obtained sets 241, 242, 243, 244 of head-related filter coefficients for the respective head-related filters 201, 202, 203, 204, or other representations of the respective head-related transfer functions HRFL(θ1), HRFL(θ2), HRFR(θ3), HRFR(θ4), may preferably be stored in the one or more filter datasets of the database 304 or in another non-volatile memory of the processor 200.

FIG. 4*a* shows a top view of a first example virtual listening room with a first virtual loudspeaker 401 at a relative angular position −θ and a second virtual loudspeaker 402 at a relative angular position +θ with respect to the user's head 410. The first and second virtual loudspeakers 401, 402 are positioned symmetrically in front of the user's head 410, and the symmetry plane is indicated by the dashed line α=0 which also indicates the front direction relative to the user's head 410.

In a standard stereo set-up, it is typically recommended that the relative angular separation of the loudspeakers is about 60°. In the first example virtual listening room, the relative angular position −θ of the first virtual loudspeaker 401 may thus equal −30°, and the relative angular position +θ of the second virtual loudspeaker 402 may equal +30°. Correspondingly, the equalizer controller 232 may determine representations of head-related transfer functions of the head-related filters 201, 202, 203, 204 that equal respectively HRFL(−30°), HRFL(+30°), HRFR(−30°), and HRFR(+30°), wherein HRFL(θ) is a head-related transfer function for the left ear of the user and HRFR(θ) is a head-related transfer function for the right ear of the user. In this case, and assuming that the user's head and ears are laterally symmetrical, the four head-related transfer functions (not shown) from the virtual sound sources 401, 402 to each of the user's ears are pairwise equal. Referring to FIG. 2, the transfer function HRFL(θ1) of the first head-related filter 201 will be equal to the transfer function HRFR(θ4) of the fourth head-related filter 204, and the transfer function HRFL(θ2) of the second head-related filter 202 will be equal to the transfer function HRFR(θ3) of the third head-related filter 203. In other words, the first head-related transfer function HRFL(−30°) will equal the fourth head-related transfer function HRFR(+30°), and the second head-related transfer function HRFL(+30°) will equal the third head-related transfer function HRFR(−30°). In this case, the first equalizer transfer function EQL preferably equals the second equalizer transfer function EQR, which may reduce the amount of necessary filter computations and/or storing and retrieval of datasets by 50%. If this configuration of the head-related filters is maintained, for instance when a head tracker is not used (a is fixed), then the user will typically perceive the virtual sound sources 401, 402 as following the orientation of their head.

Note that if the relative angular positions of the first virtual loudspeaker 401 and the second virtual loudspeaker 402 are not symmetrical with respect to the front direction α=0, and/or if the user's head is assumed to be not symmetric, then the head-related transfer functions HRFL(θ1), HRFL(θ2), HRFR(θ3), HRFR(θ4) will generally differ from each other, and the first equalizer transfer function EQL will generally not equal the second equalizer transfer function EQR.

FIG. 4*b* shows a second top view of the first example virtual listening room, wherein the user has turned their head 410 halfway toward the second virtual loudspeaker. In other words, the user's head 410 has a relative angular orientation α of 15° compared to the orientation shown in FIG. 4*a*. The relative angular orientation α may be determined by a head tracker and communicated to the processor 200 in an orientation signal as described further above. In response to the change of the relative angular orientation α, and to maintain the absolute position of the first and the second virtual loudspeakers, the equalizer controller 232 may thus determine representations of head-related transfer functions of the head-related filters 201, 202, 203, 204 that equal respectively HRFL(−45°), HRFL(+15°), HRFR(−45°), and HRFR (+15°) wherein the angular orientation α of 15° has been accommodated into the respective relative angular positions θ1, θ2, θ3, θ4, i.e. θ1 and θ3 equal −45°, while 02 and 64 equal +15°. The equalizer controller 232 may preferably maintain the first and second sets 248, 249 of equalizer coefficients as is, i.e. as determined for the first example virtual listening room with the first and second virtual loudspeakers 401, 402 positioned symmetrically in front of the user's head 410. In some examples, the relative angular orientation value α may be communicated at a rate of about every 20 ms to achieve stable perceived absolute positions of the first and second virtual loudspeakers 401, 402, or faster or slower, such as in the range from every 5 ms to every 500 ms, as circumstances demand or allow and/or in dependence on user input via a user interface 305.

Figure 5:
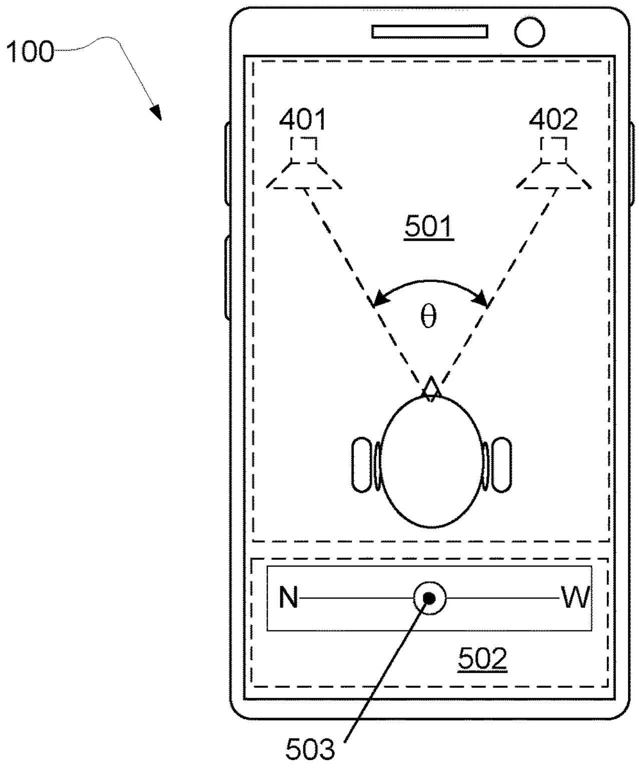
FIG. 5 shows a user interface for receiving a relative angular position value.

FIG. 5 shows a user interface for receiving a relative angular position value θ, which indicates an angular separation of two virtual loudspeakers 401, 402 in a virtual listening room, such as in the first example virtual listening room. The relative angular position value θ thus equals the absolute difference between the relative angular position −θ of the first virtual loudspeaker 401 and the relative angular position +θ of the second virtual loudspeaker 402 in FIG. 4*a*. The user interface includes a first portion 501 showing a top view of the virtual listening room with the first and second virtual loudspeakers 401, 402 positioned symmetrically in front of the user's head 410. The first portion 501 displays a selected angular separation value of θ and preferably changes the geometrical illustration of the virtual listening room to represent other selected values of θ. The user interface also includes a second portion 502 including a slider control 503 or another type of affordance enabling the user to select a value of θ (or e.g. θ1 and θ2) e.g. by sliding the slider control from N (narrow) to W (wide). The user interface may be displayed via an application being executed by the electronic device 100.

Figure 6:
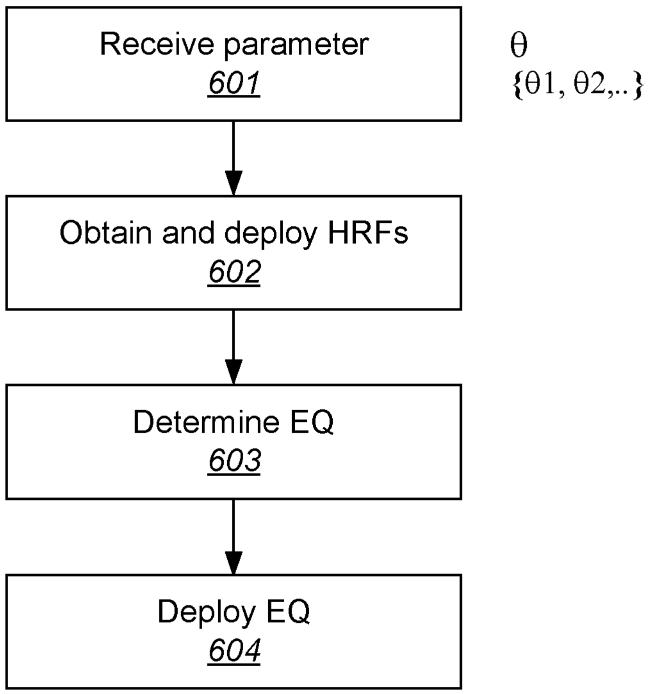
FIG. 6 shows a flowchart.

FIG. 6 shows a flowchart. In a first step 601 the processor receives one or more angular separation values of θ (wherein θ has the meaning as shown in FIG. 5) e.g. from the user interface or a stored fixed value.

In step 602 head related transfer functions (HRFs) are obtained and deployed e.g. based on filter datasets, each indicating a set of filter coefficients 241, 242, 243, 245 for a respective head-related filter 201, 202, 203, 204. The head related filter datasets are obtained from a non-volatile memory, where they have been stored and may be based on a generic head shape or a personal head shape of the user. The filter datasets may be determined as described further above. The head related transfer functions (HRFs) are deployed for processing the multichannel audio signal.

Based on the head related transfer functions (HRFs), equalizing is determined in step 603 as described in more detail herein. Subsequently, the first equalizer transfer function EQL and the second equalizer transfer function EQR are deployed to enable equalizing in accordance with the head related transfer functions (HRFs).

The flowchart illustrates a method that may be performed each time the user selects a value of θ or {θ1, θ2, . . . }, at power up, or in response to other events.

FIG. 7 shows a top view of a user's head in a second example virtual listening room with a first virtual loudspeaker 401 at a relative angular position θ1, a second virtual loudspeaker 402 at a relative angular position θ2, a third virtual loudspeaker 701 at a relative angular position θ3, and a fourth virtual loudspeaker 402 at a relative angular position θ4 with respect to the user's head 410. The first and second virtual loudspeakers 401, 402 are positioned asymmetrically in front of the user's head 410, while the third and fourth virtual loudspeakers 701, 702 are positioned symmetrically behind the user's head 410, and the symmetry plane is indicated by the dashed line α=0 which also indicates the front direction relative to the user's head 410. For best results, however, all virtual loudspeakers 401, 402, 701, 702 should be positioned pairwise symmetrically with respect to the front direction α=0.

The second example virtual listening room illustrates spatialization of a multichannel audio signal with four or more signals C1, C2, C3, C4 (see FIG. 8) such as e.g. a 5.1 or 7.1 surround sound signal. For instance, in the spatialization of a 5.1 surround sound signal, the first virtual loudspeaker 401 may reproduce a front left channel signal C1, the second virtual loudspeaker 402 may reproduce a front right channel signal C2, the third virtual loudspeaker 701 may reproduce a rear left channel signal C3, and the fourth virtual loudspeaker 402 may reproduce a rear right channel signal C4. Preferably, a centre channel signal may be mixed into the front left channel signal C1 and the front right channel signal C2 before the spatialization. Alternatively, it may be reproduced by a front centre virtual loudspeaker (not shown) and spatialized using further head-related filters that feed into the first and second combiners 210, 211 in the same way as the head-related filters 201, 202, 203, 204 shown in FIG. 2, or it may be omitted. Similarly, a bass channel signal may be mixed into the rear left channel signal C3 and the rear right channel signal C4 before the spatialization. Alternatively, it may be reproduced by a rear centre virtual loudspeaker (not shown) and spatialized using further head-related filters that feed into the first and second combiners 210, 211, it may be added to the first and second equalized audio signals L2, R2 after the spatialization, or it may be omitted. Note that when the centre channel and/or the bass channel are spatialized using further head-related filters, then each of these further head-related filters is included in one of the left and the right channel processing paths, depending on which of the first and second combiners 210, 211 the respective further head-related filter feeds into.

Figure 8:
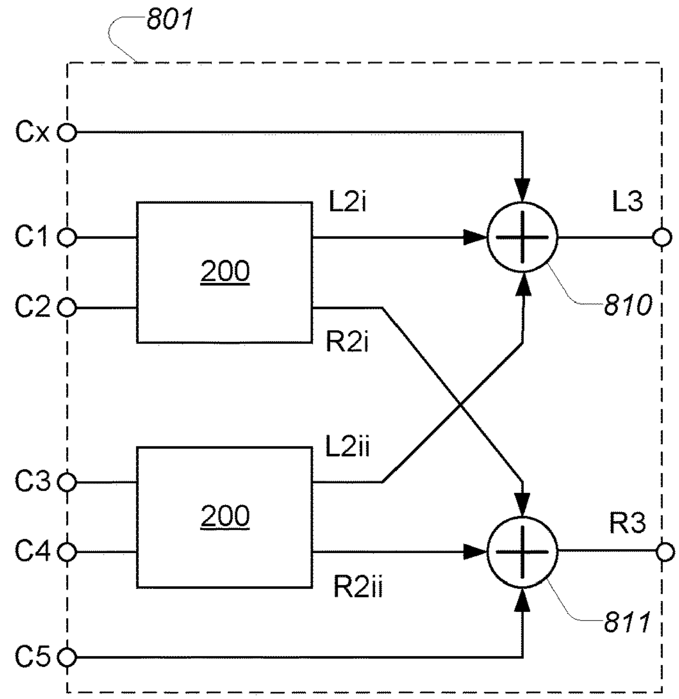
FIG. 8 shows a second block diagram of a processor.

FIG. 8 shows a second block diagram of a processor 801 Here, a multichannel audio signal with four, five or more channels can be processed by the processor 801. The audio signals C1, C2, C3, C4 of a multichannel audio signal are pairwise input to two respective processors 200 as described above, e.g. in connection with FIG. 2. Each processor 200 spatializes and equalizes respectively the audio signals C1, C2 and the audio signals C3, C4 as described further above to provide a left equalized audio signal, respectively L2*i* and L2*ii*, and a right equalized audio signal, respectively R2*i* and R2*ii*. The left equalized audio signals L2*i*, L2*ii* are input to a third combiner 810, and the right equalized audio signals R2*i*, R2*ii* are input to a fourth combiner 811. The combiners 810 and 811 combine respectively the left equalized audio signals L2*i*, L2*ii* and the right equalized audio signals R2*i*, R2*ii* to provide respectively a left audio output signal L3 and a right audio output signal R3. The block diagram shown in FIG. 8 illustrates process steps of a method for processing a multichannel audio signal as well as functional blocks of an audio device for processing a multichannel audio signal.

As illustrated in FIG. 7, the audio signal C1 may be a front left channel signal, the audio signal C2 may be a front right channel signal, the audio signal C3 may be a rear left channel signal, and the audio signal C4 may be a rear right channel signal. Correspondingly, a first one of the processors 200 may spatialize and equalize the front channel signals C1, C2 to provide a front left equalized audio signal L2*i* to be reproduced by a first virtual loudspeaker 401 positioned front left of the user and front right equalized audio signal R2*i* to be reproduced by a second virtual loudspeaker 402 positioned front right of the user. Similarly, the other one of the processors 200 may spatialize and equalize the rear channel signals C3, C4 to provide a rear left equalized audio signal L2*ii* to be reproduced by a third virtual loudspeaker 701 positioned rear left of the user and rear right equalized audio signal R2*ii* to be reproduced by a fourth virtual loudspeaker 702 positioned rear right of the user.

Preferably, a centre channel signal may be mixed into the front left channel signal C1 and the front right channel signal C2 before the spatialization. Also, a bass channel signal, here shown as two signals C5, Cx, may be added to the left equalized audio signals L2*i*, L2*ii* by the third combiner 810 and to the right equalized audio signals R2*i*, R2*ii* by the fourth combiner 811.

Figure 9:
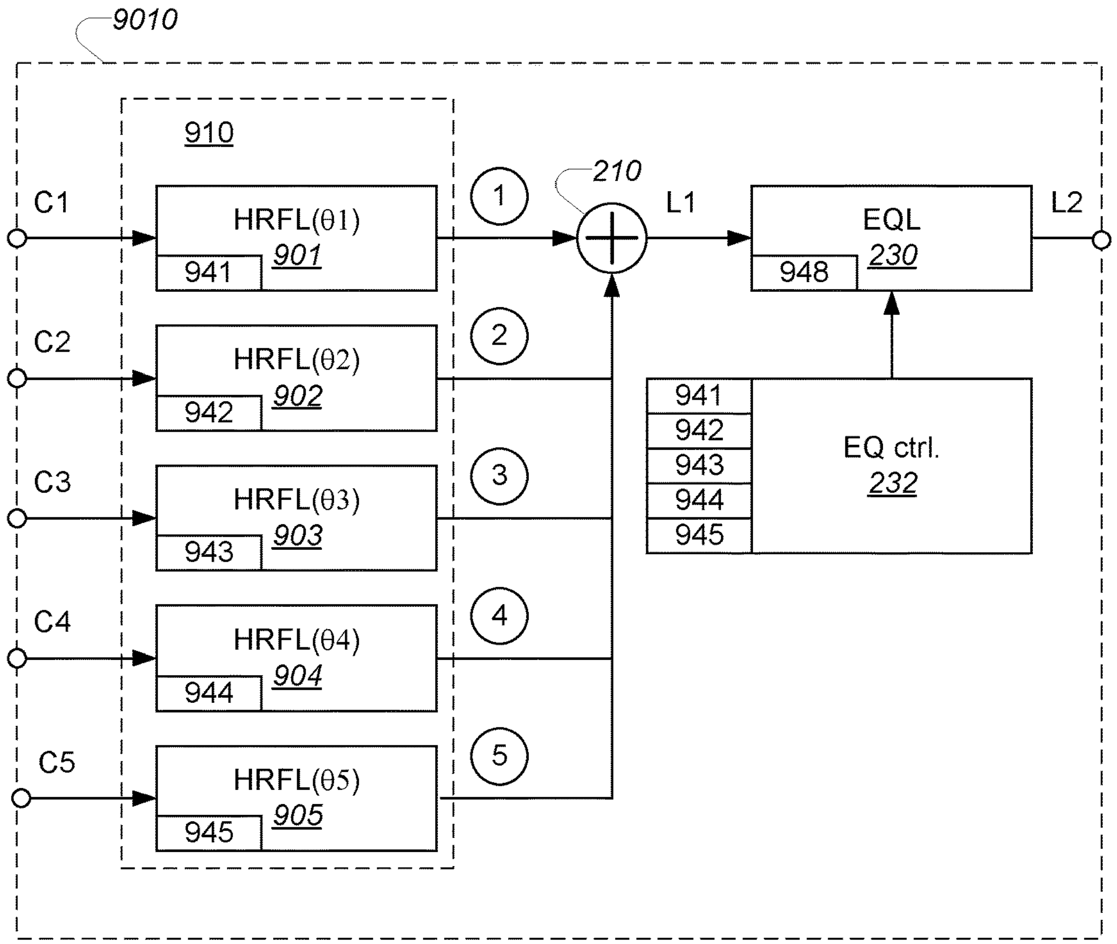
FIG. 9 shows a third block diagram of a processor.

FIG. 9 shows a third block diagram of a processor 9010. Here, a multichannel audio signal with three, four, five or more channels can be processed by the processor 9010. It should be noted that, for simplicity, the third block diagram illustrates processing to provide only a left equalized audio signal L2 based on the channel signals C1, C2, C3, C4, C5. The third block diagram thus shows a left channel processing path of a processor as defined above in connection with FIG. 2, however with five channel signals C1, C2, C3, C4, C5 as inputs to a left-side lateral spatializer 910, 210. A corresponding right channel processing path with the same five channel signals C1, C2, C3, C4, C5 as inputs to a right-side lateral spatializer is configured similarly. The block diagram shown in FIG. 9 illustrates process steps of a method for processing a multichannel audio signal as well as functional blocks of an audio device for processing a multichannel audio signal.

The head related filters are arranged in a third set 910 of head-related filters 901, 902, 903, 904, 905 each configured to provide a respective filtered signal 1, 2, 3, 4, 5 based on a respective set 941, 942, 943, 944, 945 of head-related filter coefficients. The sets 941, 942, 943, 944, 945 of filter coefficients correspond to respective values θ1, θ2, θ3, θ4, θ5 of relative angular positions of the virtual loudspeakers 401, 402, 701, 702 to reproduce the respective channels signals C1, C2, C3, C4, C5. The combiner 210 combines the filtered signals 1, 2, 3, 4, 5 as described further above. The equalizer controller 232 determines the sets 941, 942, 943, 944, 945 of filter coefficients as well as the equalizer coefficients 948 as described further above.

In the processor 9010, the fifth channel signal C5 and the fifth head-related filter 905 may be omitted. Also, the fourth channel signal C4 and the fourth head-related filter 904 may be omitted.

The electronic device 100 is an example of a processing device that may comprise the processor 200, the system 300, and/or a portion of the system 300 described above. The electronic device 100 may further execute the methods described above, or parts hereof. Also, the earphones 120, 121 and the headphone 130 are examples of audio devices, in particular binaural listening devices, that may comprise the processor 200, the system 300, and/or a portion of the system 300 described above. The earphones 120, 121, the headphone 130, and/or another binaural listening device may further execute the methods described above, or parts hereof. Other electronic devices may execute the methods described above, or parts hereof. Such other electronic devices may include, for example, smartphones, tablet computers, laptop computers, smart-watches, smart glasses, VR/AR headsets, and server computers that may e.g. also host an audio streaming or media streaming service.

A non-transitive computer-readable storage medium may comprise one or more programs for execution by one or more processors of an electronic device with one or more processors, and memory, wherein the one or more programs include instructions for performing the methods disclosed herein. An electronic device may execute the methods disclosed herein based on one or more programs obtained from the non-transitive computer-readable storage medium.

In some embodiments, the system 300 is comprised by one or more hardware device that may be connected to, or may comprise, a binaural listening device 120, 121, 130. The processor 200 and/or other parts of the system 300 may be implemented on one or more general purpose processors, one or more dedicated processors, such as signal processors, dedicated hardware devices, such as digital filter circuits, and/or a combination thereof. Correspondingly, functional blocks of digital circuits, such as a processor, may be implemented in hardware, firmware or software, or any combination hereof. Digital circuits may perform the functions of multiple functional blocks in parallel and/or in interleaved sequence, and functional blocks may be distributed in any suitable way among multiple hardware units, such as e.g. signal processors, microcontrollers and other integrated circuits. Generally, individual steps of methods described above may be executed by any of the audio devices 100, 120, 121, 130, processors 200, and/or systems 300 disclosed herein.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

The invention claimed is:

1. A method for processing a spatialized multichannel audio signal that comprises a first spatialized audio signal and a second spatialized audio signal, wherein the first spatialized audio signal has been spatialized by a first lateral spatializer of a multichannel audio spatializer, the second spatialized audio signal has been spatialized by a second lateral spatializer of the multichannel audio spatializer, and the first spatialized audio signal differs from the second spatialized audio signal, the method comprising:

by a first equalizer having a first equalizer transfer function receiving and filtering the first spatialized audio signal based on a first set of equalizer coefficients to provide a first equalized audio signal; and by a second equalizer having a second equalizer transfer function receiving and filtering the second spatialized audio signal based on a second set of equalizer coefficients to provide a second equalized audio signal, wherein:

the first equalizer at least partly compensates for undesired coloration in the first spatialized audio signal in a mono-source scenario wherein the first spatialized audio signal equals the second spatialized audio signal; and the second equalizer at least partly compensates for undesired coloration in the second spatialized audio signal in a mono-source scenario wherein the first spatialized audio signal equals the second spatialized audio signal;

by an equalizer controller:

obtaining a representation of a first mono-source transfer function characterizing the first lateral spatializer and a representation of a second mono-source transfer function characterizing the second lateral spatializer;

determining the first set of equalizer coefficients based on the representation of the first mono-source transfer function and a representation of a first predefined target transfer function such that the product of the first mono-source transfer function and the first equalizer transfer function at least within a working frequency range aligns with the first predefined target transfer function; and determining the second set of equalizer coefficients based on the representation of the second mono-source transfer function and a representation of a second predefined target transfer function such that the product of the second mono-source transfer function and the second equalizer transfer function at least within the working frequency range aligns with the second predefined target transfer function.

2. The method according to claim 1, wherein the equalizer controller further:

receives the representation of the first mono-source transfer function and the representation of the second mono-source transfer function from an external device with a processor that comprises or controls the first lateral spatializer and the second lateral spatializer.

3. The method according to claim 1, wherein the obtaining of the representation of the first mono-source transfer function comprises:

feeding identical input audio signals to the inputs of the first lateral spatializer, and comparing the first spatialized audio signal with at least one of the input audio signals; and wherein the obtaining of the representation of the second mono-source transfer function comprises;

feeding identical input audio signals to the inputs of the second lateral spatializer, and comparing the second spatialized audio signal with at least one of the input audio signals.

4. The method according to claim 1, further comprising:

by each of the first lateral spatializer and the second lateral spatializer:

receiving a multichannel audio signal comprising a first audio signal and a second audio signal, wherein the first lateral spatializer comprises a first combiner, a first head-related filter, and a second head-related filter, wherein the second lateral spatializer comprises a second combiner, a third head-related filter, and a fourth head-related filter, wherein the first head-related filter emulates a first acoustic path from a first virtual loudspeaker to a first ear of a user, wherein the second head-related filter emulates a second acoustic path from a second virtual loudspeaker to the first ear of the user, wherein the third head-related filter emulates a third acoustic path from the first virtual loudspeaker to a second ear of the user, and wherein the fourth head-related filter emulates a fourth acoustic path from the second virtual loudspeaker to the second ear of the user; and by the first head-related filter:

applying a first head-related transfer function to the first audio signal in conformance with a first set of filter coefficients to provide a first filtered signal;

by the second head-related filter:

applying a second head-related transfer function to the second audio signal in conformance with a second set of filter coefficients to provide a second filtered signal;

by the third head-related filter:

applying a third head-related transfer function to the first audio signal in conformance with a third set of filter coefficients to provide a third filtered signal;

by the fourth head-related filter;

applying a fourth head-related transfer function to the second audio signal in conformance with a fourth set of filter coefficients to provide a fourth filtered signal;

by the first combiner:

providing the first spatialized audio signal based on a combination of the first filtered signal and the second filtered signal; and by the second combiner:

providing the second spatialized audio signal based on a combination of the third filtered signal and the fourth filtered signal, wherein the first combiner, the first head-related transfer function and the second head-related transfer function together define the first mono-source transfer function, and wherein the second combiner, the third head-related transfer function and the fourth head-related transfer function together define the second mono-source transfer function.

5. The method according to claim 1, wherein the equalizer controller:

receives a position signal indicating at least one of a relative angular position of the first virtual loudspeaker or the second virtual loudspeaker and, in response to receiving the position signal:

determines two or more of the first, second, third and fourth sets of head-related filter coefficients based on the position signal;

obtains an updated representation of the first mono-source transfer function and an updated representation of the second mono-source transfer function, wherein the updated representations reflect changes in the first, second, third, and fourth head-related transfer functions;

determines the first set of equalizer coefficients based on the updated representation of the first mono-source transfer function; and determines the second set of equalizer coefficients based on the updated representation of the second mono-source transfer function.

6. The method according to claim 1, wherein the equalizer controller:

receives an orientation signal indicating a relative angular orientation of the user's head and, in response to receiving the orientation signal:

determines the first, second, third, and fourth sets of head-related filter coefficients based on the orientation signal; and maintains the first and second sets of equalizer coefficients as is in response to detecting a change in the relative angular orientation indicated by the orientation signal.

7. The method according to claim 1, further comprising providing the first equalized audio signal and the second equalized audio signal to a binaural listening device.

8. A method for processing a spatialized multichannel audio signal that comprises a first spatialized audio signal and a second spatialized audio signal, wherein the first spatialized audio signal has been spatialized by a first lateral spatializer of a multichannel audio spatializer, the second spatialized audio signal has been spatialized by a second lateral spatializer of the multichannel audio spatializer, and the first spatialized audio signal differs from the second spatialized audio signal, the method comprising:

by a first equalizer having a first equalizer transfer function receiving and filtering the first spatialized audio signal based on a first set of equalizer coefficients to provide a first equalized audio signal; and by a second equalizer having a second equalizer transfer function receiving and filtering the second spatialized audio signal based on a second set of equalizer coefficients to provide a second equalized audio signal, wherein:

the first equalizer at least partly compensates for undesired coloration in the first spatialized audio signal in a mono-source scenario wherein the first spatialized audio signal equals the second spatialized audio signal; and the second equalizer at least partly compensates for undesired coloration in the second spatialized audio signal in a mono-source scenario wherein the first spatialized audio signal equals the second spatialized audio signal;

by an equalizer controller:

obtaining a representation of a first mono-source transfer function characterizing the first lateral spatializer and a representation of a second mono-source transfer function characterizing the second lateral spatializer;

determining the first set of equalizer coefficients based on the representation of the first mono-source transfer function and a representation of a first predefined target transfer function, wherein determining the first set of equalizer coefficients comprises inverting a representation of the first mono-source transfer function; and determining the second set of equalizer coefficients based on the representation of the second mono-source transfer function and a representation of a second predefined target transfer function, wherein determining the second set of equalizer coefficients comprises inverting a representation of the second mono-source transfer function.

9. A non-transitory computer-readable storage medium comprising one or more programs for execution by one or more processors of an electronic device with one or more processors, and memory, the one or more programs including instructions for performing the method of claim 1.

10. An electronic device comprising one or more processors and memory storing one or more programs, the one or more programs including instructions which, when executed by the one or more processors, cause the electronic device to perform the method of claim 1.

11. An audio device comprising:

a processor for processing a spatialized multichannel audio signal, the spatialized multichannel audio signal comprising:

a first spatialized audio signal and a second spatialized audio signal, wherein the first spatialized audio signal has been spatialized by a first lateral spatializer of a multichannel audio spatializer, the second spatialized audio signal has been spatialized by a second lateral spatializer of the multichannel audio spatializer, and the first spatialized audio signal differs from the second spatialized audio signal, the processor comprising:

a first equalizer having a first equalizer transfer function configured to receive and filter the first spatialized audio signal based on a first set of equalizer coefficients to provide a first equalized audio signal;

a second equalizer having a second equalizer transfer function configured to receive and filter the second spatialized audio signal based on a second set of equalizer coefficients to provide a second equalized audio signal, wherein:

the first equalizer is configured to at least partly compensate for undesired coloration in the first spatialized audio signal in a mono-source scenario wherein the first spatialized audio signal equals the second spatialized audio signal; and the second equalizer is configured to at least partly compensate for undesired coloration in the second spatialized audio signal in a mono-source scenario wherein the first spatialized audio signal equals the second spatialized audio signal;

an equalizer controller configured to:

obtain a representation of a first mono-source transfer function characterizing the first lateral spatializer and a representation of a second mono-source transfer function characterizing the second lateral spatializer, determine the first set of equalizer coefficients based on the representation of the first mono-source transfer function and a representation of a first predefined target transfer function; and determine the second set of equalizer coefficients based on the representation of the second mono-source transfer function and a representation of a second predefined target transfer function, determine the first set of equalizer coefficients such that the product of the first mono-source transfer function and the first equalizer transfer function at least within a working frequency range aligns with the first predefined target transfer function, and determine the second set of equalizer coefficients such that the product of the second mono-source transfer function and the second equalizer transfer function at least within the working frequency range aligns with the second predefined target transfer function.

12. The audio device according to claim 11, wherein the processor further comprises;

a first lateral spatializers; and a second lateral spatializer, each configured to receive a multichannel audio signal comprising a first audio signal and a second audio signal, wherein:

the first lateral spatializer comprises a first combiner, a first head-related filter configured to emulate a first acoustic path from a first virtual loudspeaker to a first ear of a user, and a second head-related filter configured to emulate a second acoustic path from a second virtual loudspeaker to the first ear of the user;

the second lateral spatializer comprises a second combiner, a third head-related filter configured to emulate a third acoustic path from the first virtual loudspeaker to a second ear of the user, and a fourth head-related filter configured to emulate a fourth acoustic path from the second virtual loudspeaker to the second ear of the user;

the first head-related filter is configured to apply a first head-related transfer function to the first audio signal in conformance with a first set of filter coefficients to provide a first filtered signal;

the second head-related filter is configured to apply a second head-related transfer function to the second audio signal in conformance with a second set of filter coefficients to provide a second filtered signal;

the third head-related filter is configured to apply a third head-related transfer function to the first audio signal in conformance with a third set of filter coefficients to provide a third filtered signal;

the fourth head-related filter is configured to apply a fourth head-related transfer function to the second audio signal in conformance with a fourth set of filter coefficients to provide a fourth filtered signal;

the first combiner is configured to provide the first spatialized audio signal based on a combination of the first filtered signal and the second filtered signal;

the second combiner is configured to provide the second spatialized audio signal based on a combination of the third filtered signal and the fourth filtered signal;

the first combiner, the first head-related transfer function, and the second head-related transfer function together define the first mono-source transfer function; and the second combiner, the third head-related transfer function, and the fourth head-related transfer function together define the second mono-source transfer function.

13. The audio device according to claim 11, further comprising:

a binaural listening device, wherein the processor further comprises at least one of:

a processor of an electronic device 100, or a processor of the binaural listening device.

* * * * *